United States Patent
Horiuchi et al.

(10) Patent No.: US 12,092,649 B2
(45) Date of Patent: Sep. 17, 2024

(54) AUTOMATIC ANALYSIS DEVICE AND AUTOMATIC ANALYSIS SYSTEM

(71) Applicant: Hitachi High-Tech Corporation, Tokyo (JP)

(72) Inventors: Rie Horiuchi, Tokyo (JP); Akihiro Yasui, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 694 days.

(21) Appl. No.: 15/734,312

(22) PCT Filed: May 21, 2019

(86) PCT No.: PCT/JP2019/020011
§ 371 (c)(1),
(2) Date: Dec. 2, 2020

(87) PCT Pub. No.: WO2020/021829
PCT Pub. Date: Jan. 30, 2020

(65) Prior Publication Data
US 2021/0223275 A1  Jul. 22, 2021

(30) Foreign Application Priority Data
Jul. 27, 2018 (JP) .................................. 2018-140874

(51) Int. Cl.
*G01N 35/02* (2006.01)
*G01N 35/10* (2006.01)

(52) U.S. Cl.
CPC ....... *G01N 35/025* (2013.01); *G01N 35/1002* (2013.01); *G01N 35/1009* (2013.01)

(58) Field of Classification Search
CPC ............ G01N 35/025; G01N 35/1002; G01N 35/1009; G01N 2035/00435;
(Continued)

(56) References Cited

U.S. PATENT DOCUMENTS

| | | |
|---|---|---|
| 2012/0025954 A1 | 2/2012 | Takayama et al. |
| 2012/0129247 A1 | 5/2012 | Tanoshima et al. |

(Continued)

FOREIGN PATENT DOCUMENTS

| | | |
|---|---|---|
| CN | 108291919 A | 7/2018 |
| JP | 7-151766 A | 6/1995 |

(Continued)

OTHER PUBLICATIONS

International Preliminary Report on Patentability mailed on Jan. 28, 2021 for International Application No. PCT/JP2019/020011.
(Continued)

*Primary Examiner* — Robert R Raevis
(74) *Attorney, Agent, or Firm* — Baker Botts L.L.P.

(57) ABSTRACT

To save a space and to reduce a burden of a user due to an exchange work of a reagent having large capacitance.

A reagent mounting mechanism (14) including a reagent mounting part (15) serving as an installation location of containers (9a, 9b, 9c, and 19) for holding a solution such as a reagent is provided in a side surface of an analysis unit (100) to be drawable. An RFID reader (10) for reading an RFID tag (13) installed in the containers (9a, 9b, 9c, and 19) is arranged in a position matching the RFID tag (13) when the containers (9a, 9b, 9c, and 19) are placed on the reagent mounting part (15) of the drawn reagent mounting mechanism (14).

10 Claims, 14 Drawing Sheets

(58) Field of Classification Search
CPC . G01N 2035/00772; G01N 2035/0437; G01N 35/00732; G01N 2035/00752
USPC ........ 73/64.56, 863, 863.01, 864.21–864.25; 436/43, 47, 48, 174, 180; 422/63, 64, 67, 422/68.1–82.13
See application file for complete search history.

(56) References Cited

U.S. PATENT DOCUMENTS

| | | |
|---|---|---|
| 2012/0321513 A1 | 12/2012 | Nagai et al. |
| 2013/0244274 A1 | 9/2013 | Nishikawa et al. |
| 2014/0174837 A1 | 6/2014 | Kneubuehl et al. |
| 2018/0246132 A1 | 8/2018 | Mori et al. |

FOREIGN PATENT DOCUMENTS

| | | | | |
|---|---|---|---|---|
| JP | 2014-119328 A | | 6/2014 | |
| JP | 2014122892 A | * | 7/2014 | ......... G01N 35/0099 |
| JP | 2015-111146 A | | 6/2015 | |
| WO | WO 2006/060125 A2 | | 6/2006 | |
| WO | WO 2015/130466 A1 | | 9/2015 | |

OTHER PUBLICATIONS

International Search Report, mailed Aug. 13, 2019, for International Application No. PCT/JP2019/020011.
Extended European Search Report, mailed Mar. 22, 2022, for European Application No. 19841304.9.
Office Action, mailed Oct. 12, 2023, for Chinese Application No. 201980042508.9 (with English translation).

* cited by examiner

[Fig. 1]
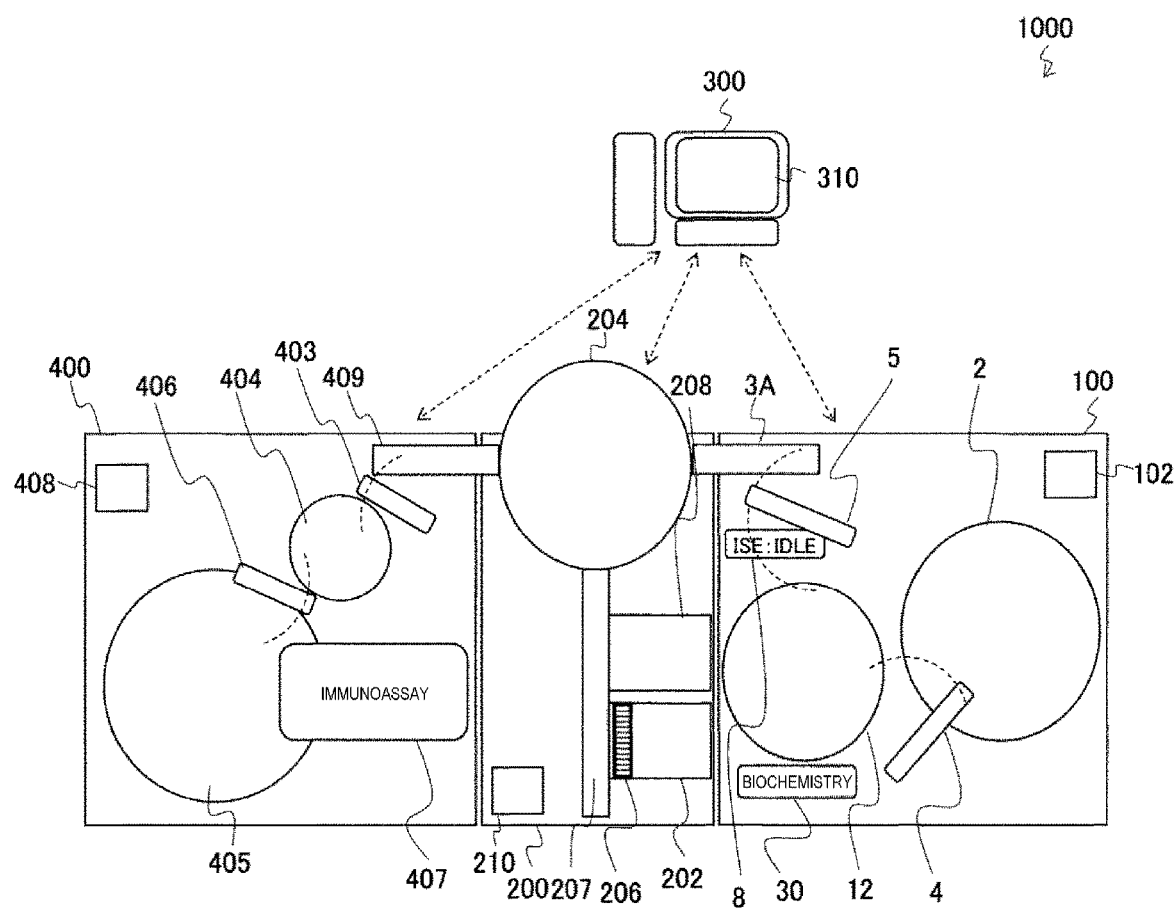

[Fig. 2]
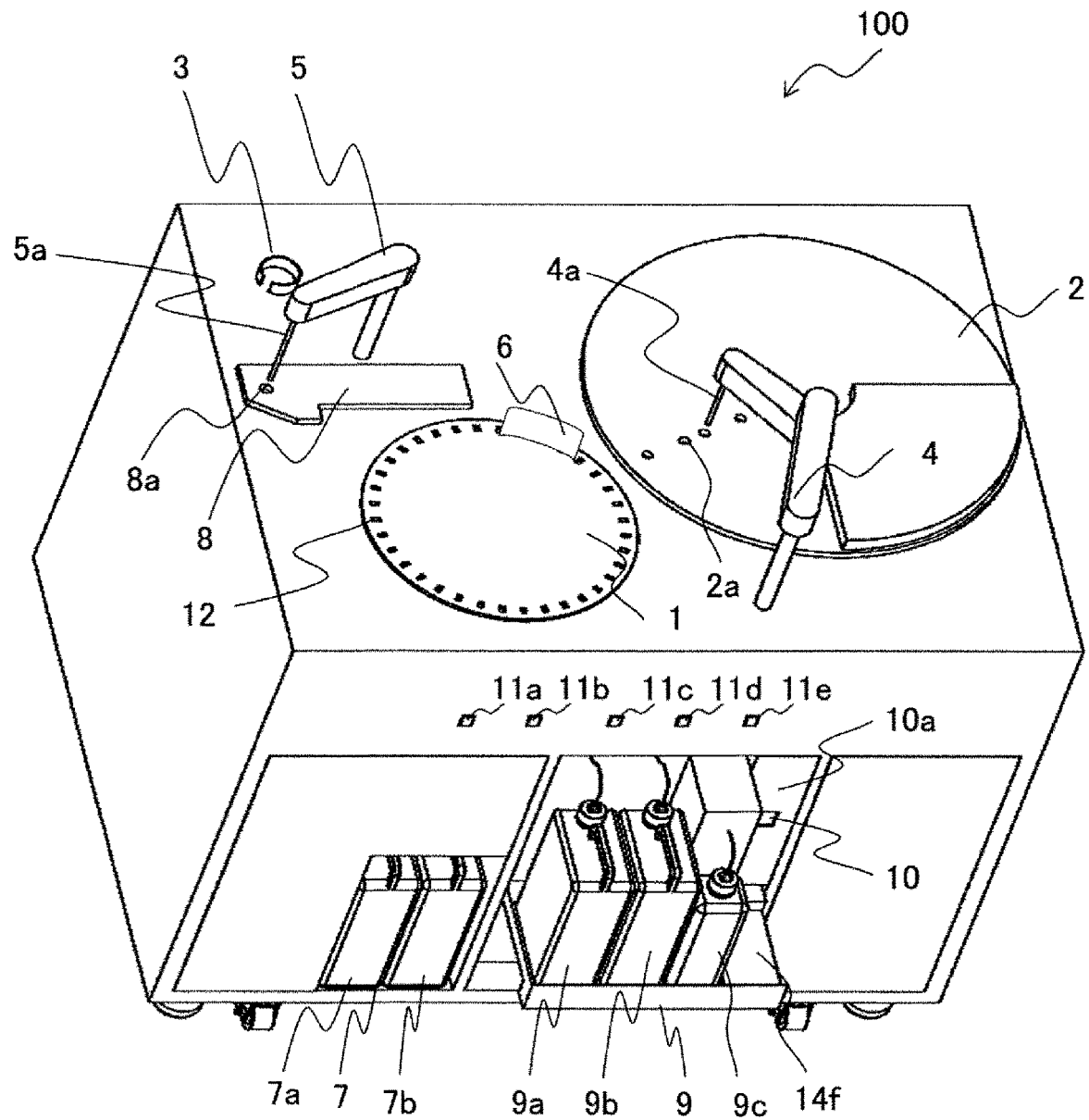

[Fig. 3]
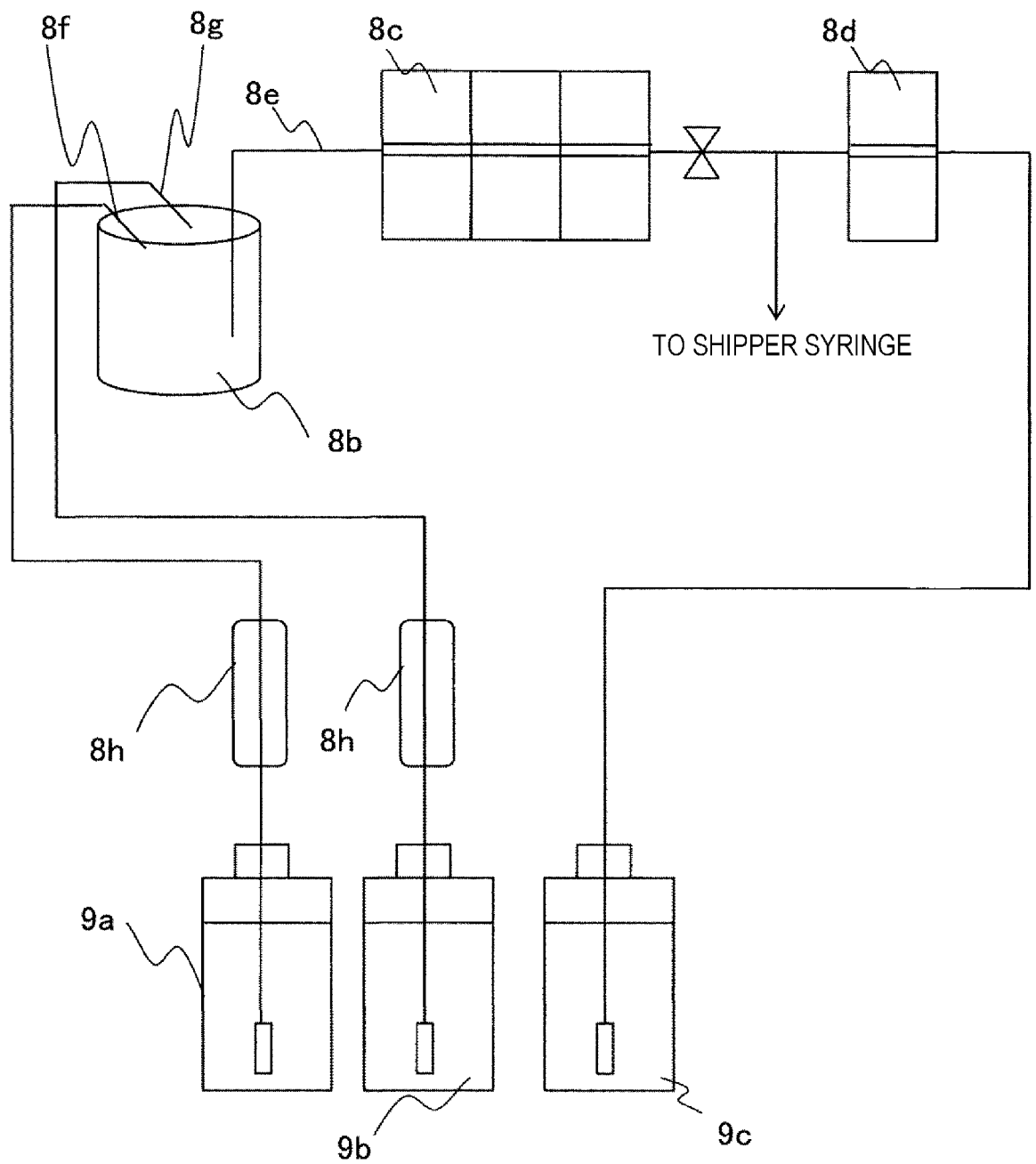

[Fig. 4]
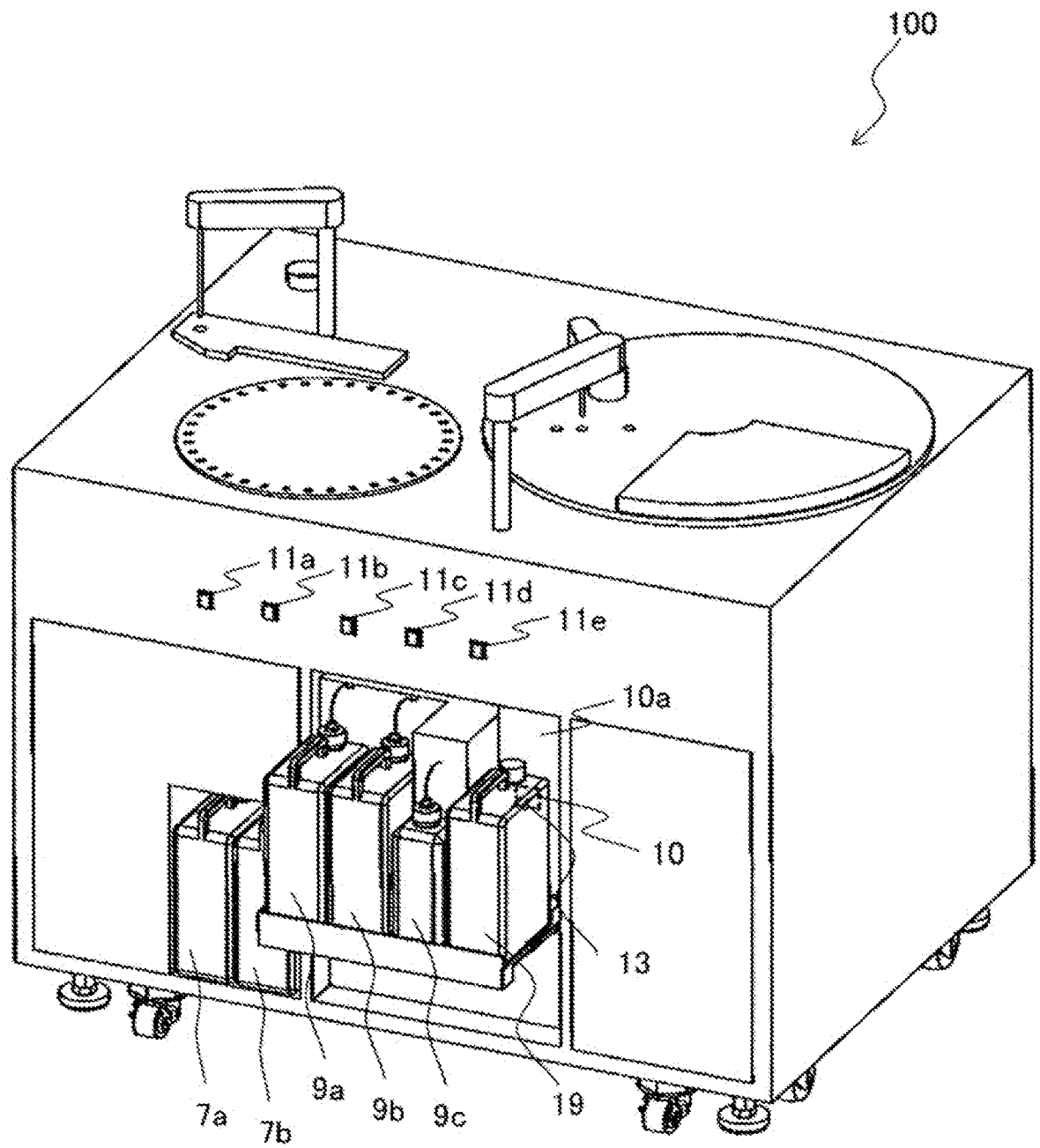

[Fig. 5]
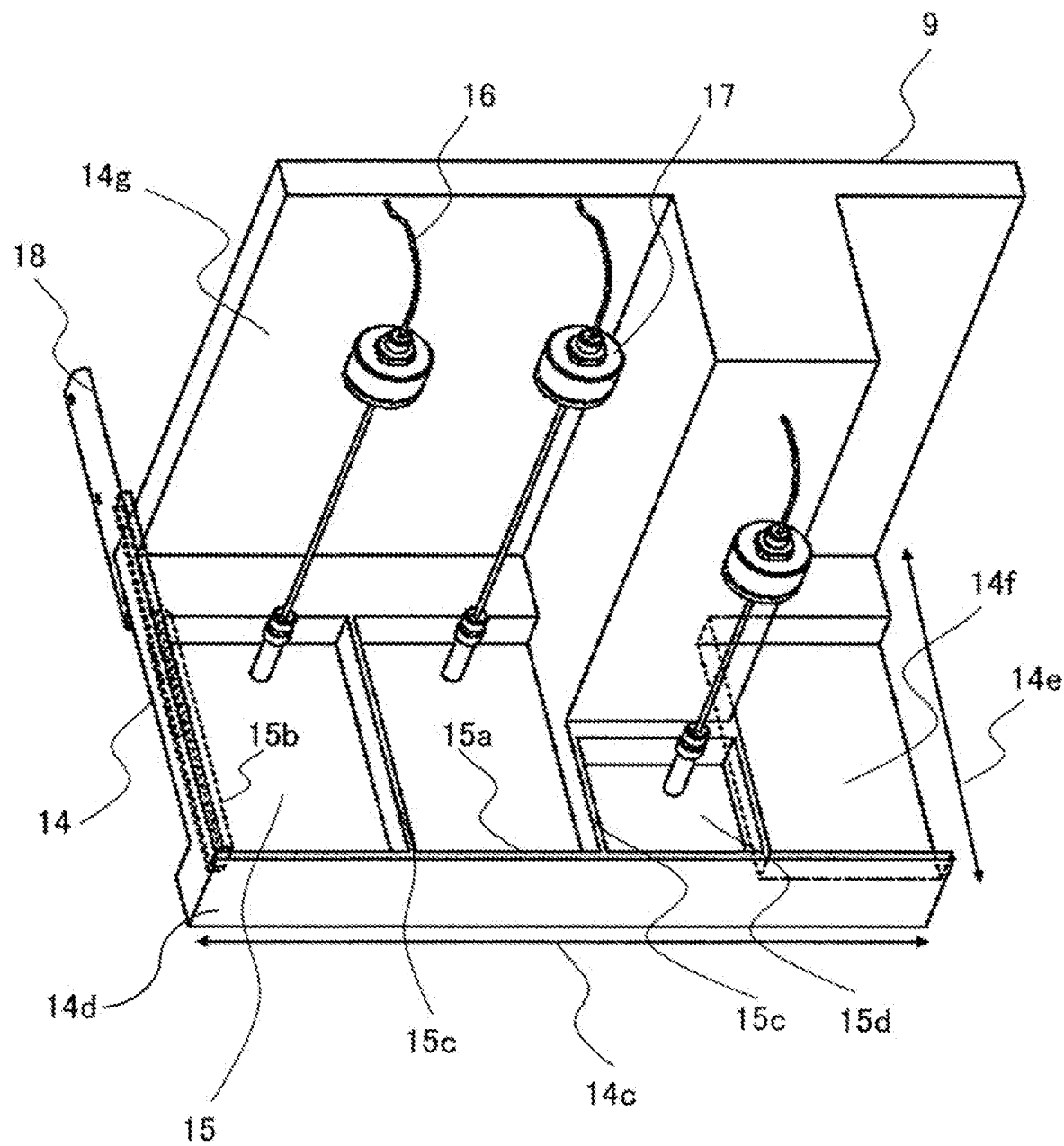

[Fig. 6]
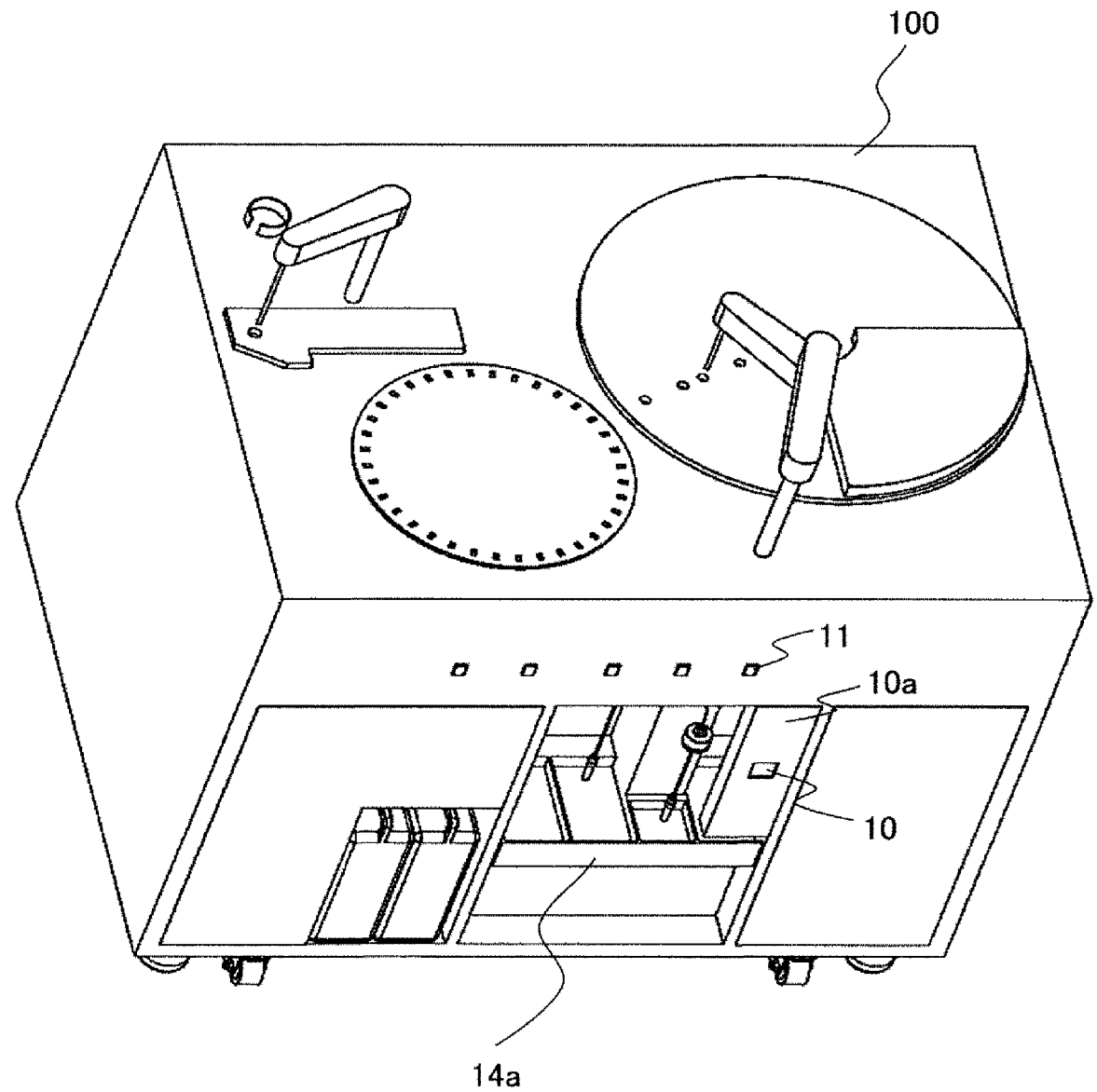

[Fig. 7]
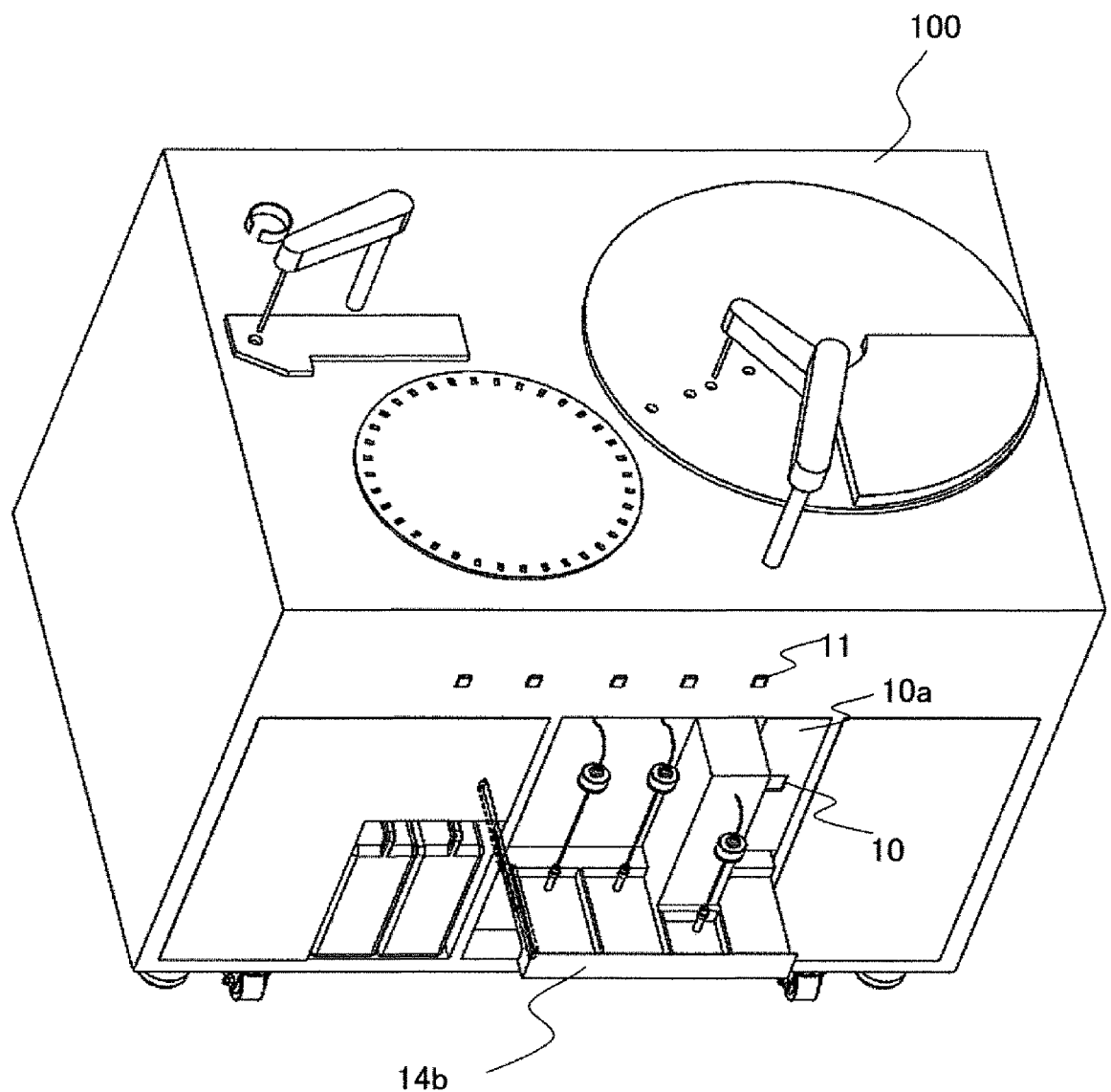

[Fig. 8]
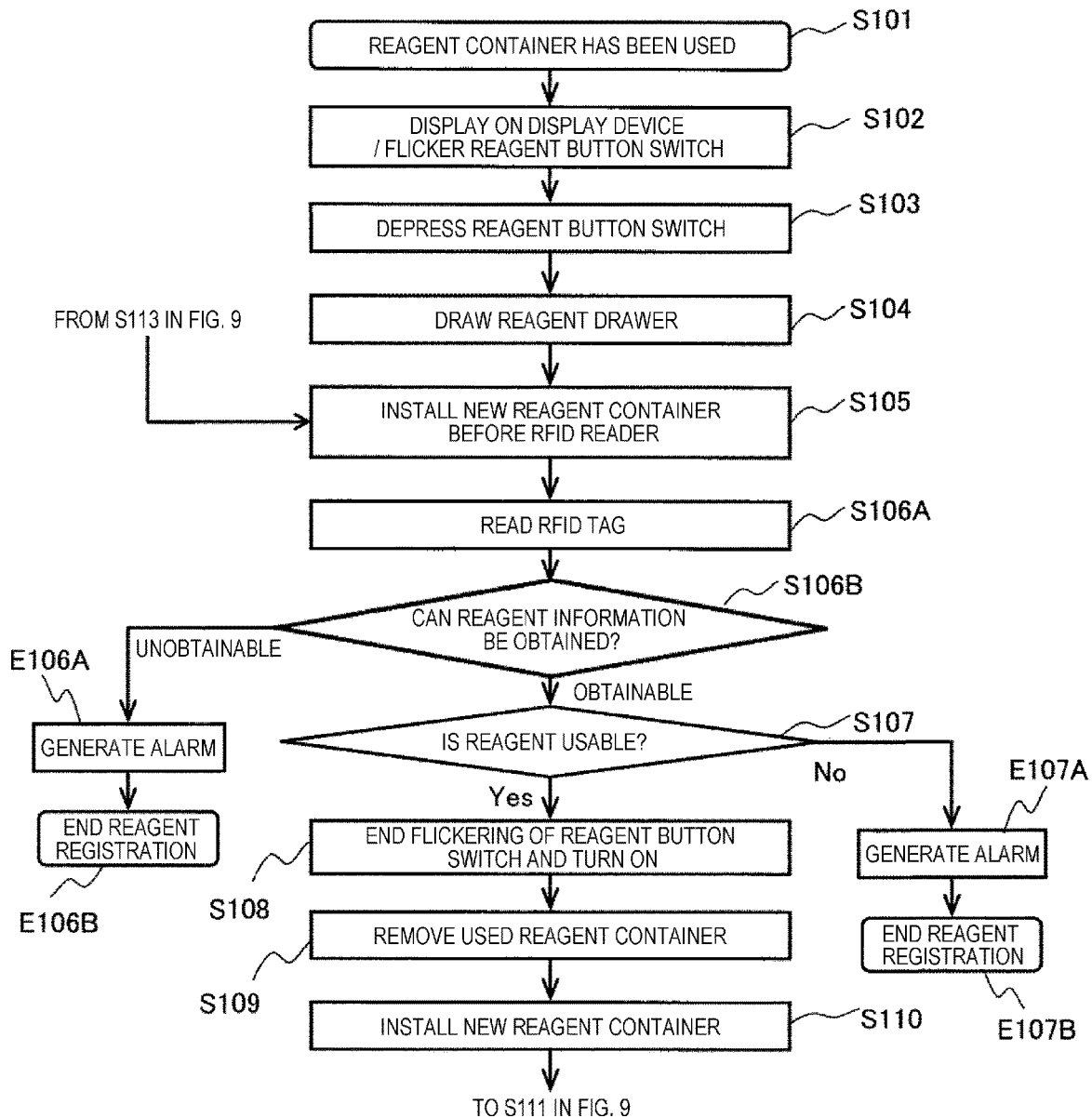

[Fig. 9]
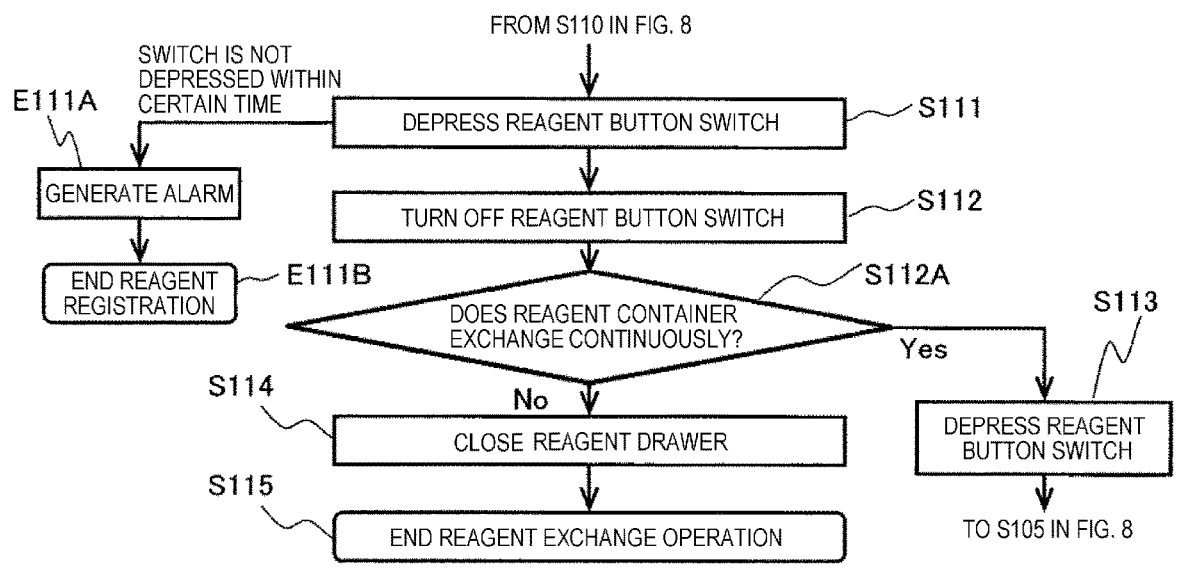

[Fig. 10]
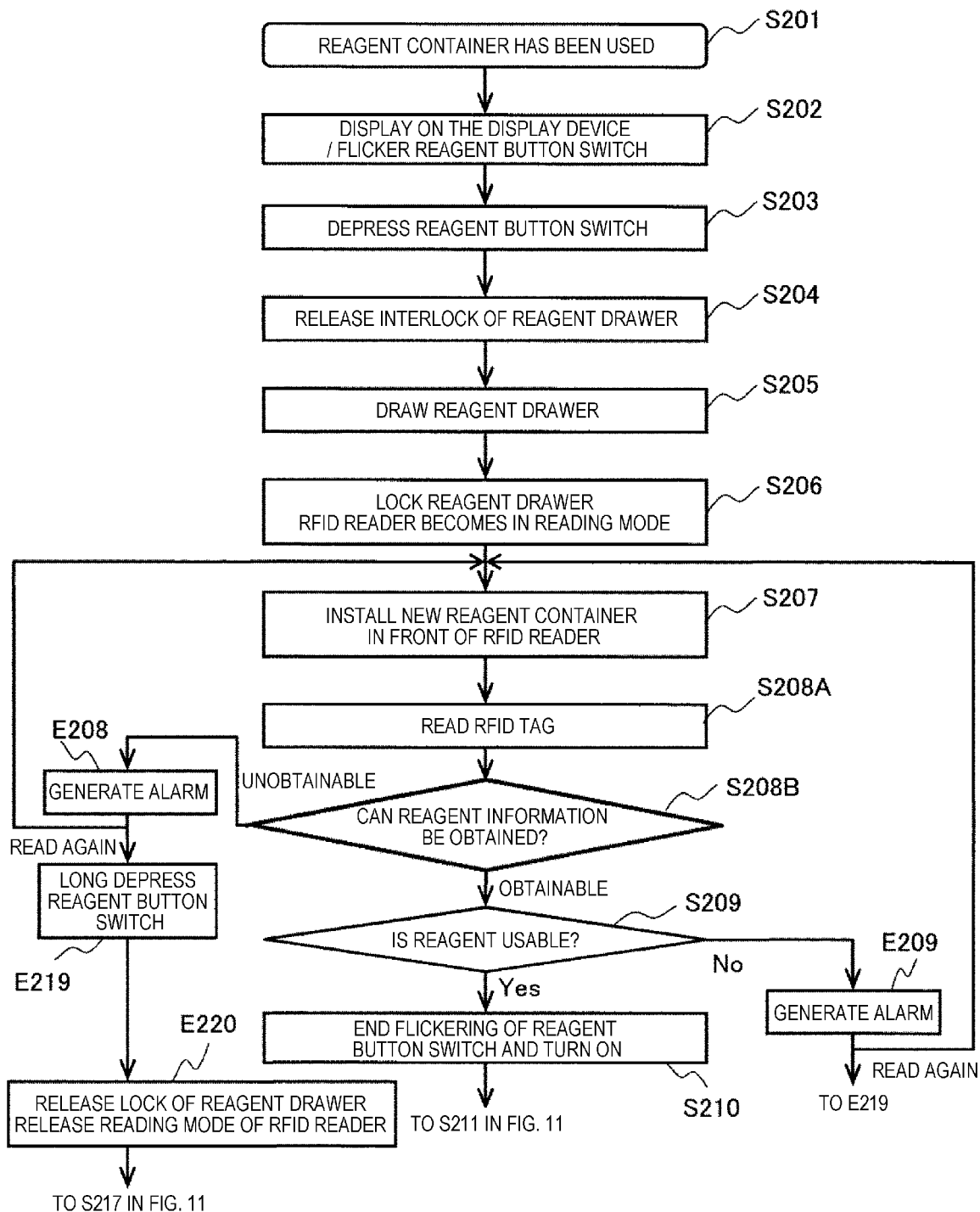

[Fig. 11]
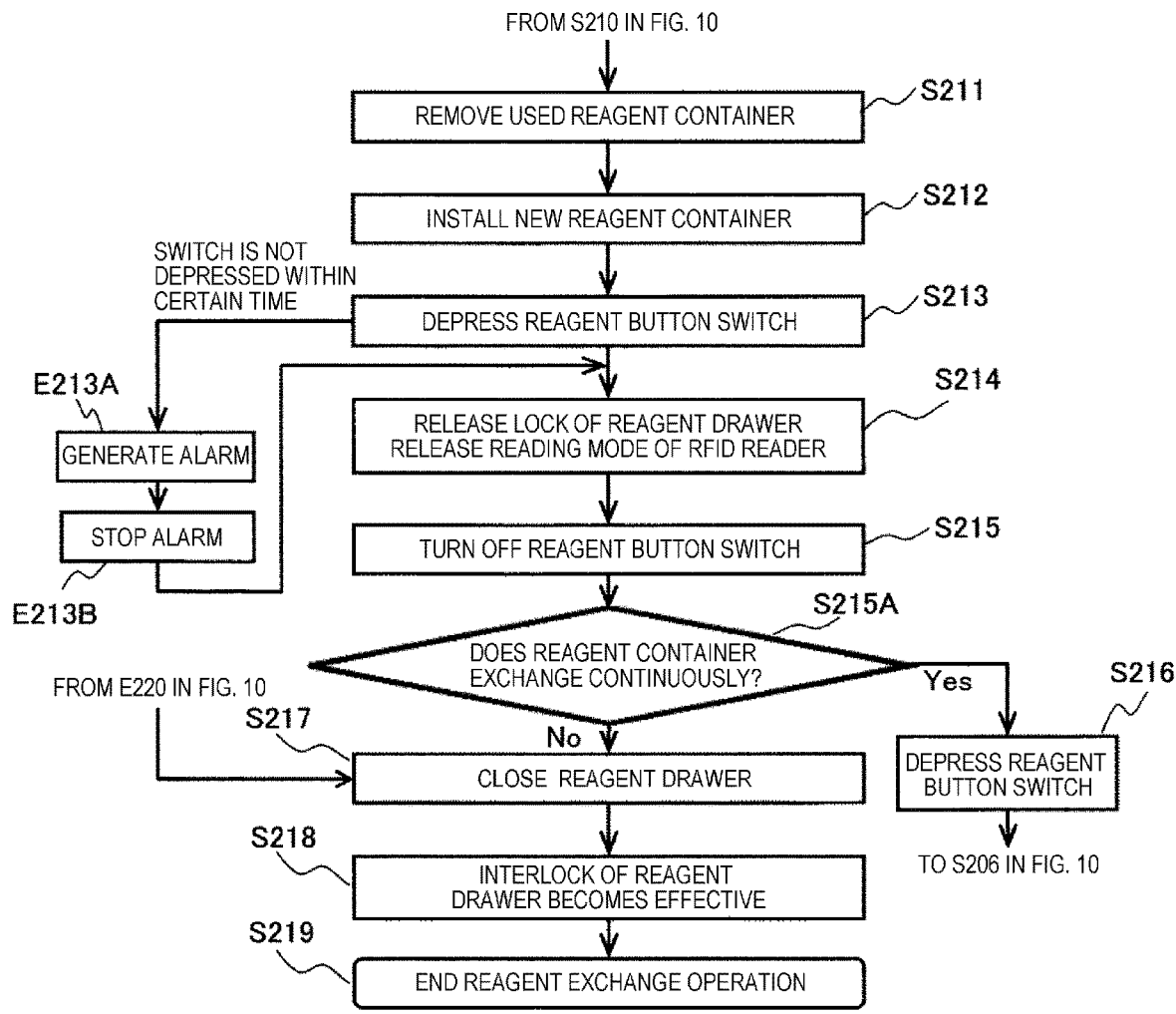

[Fig. 12]
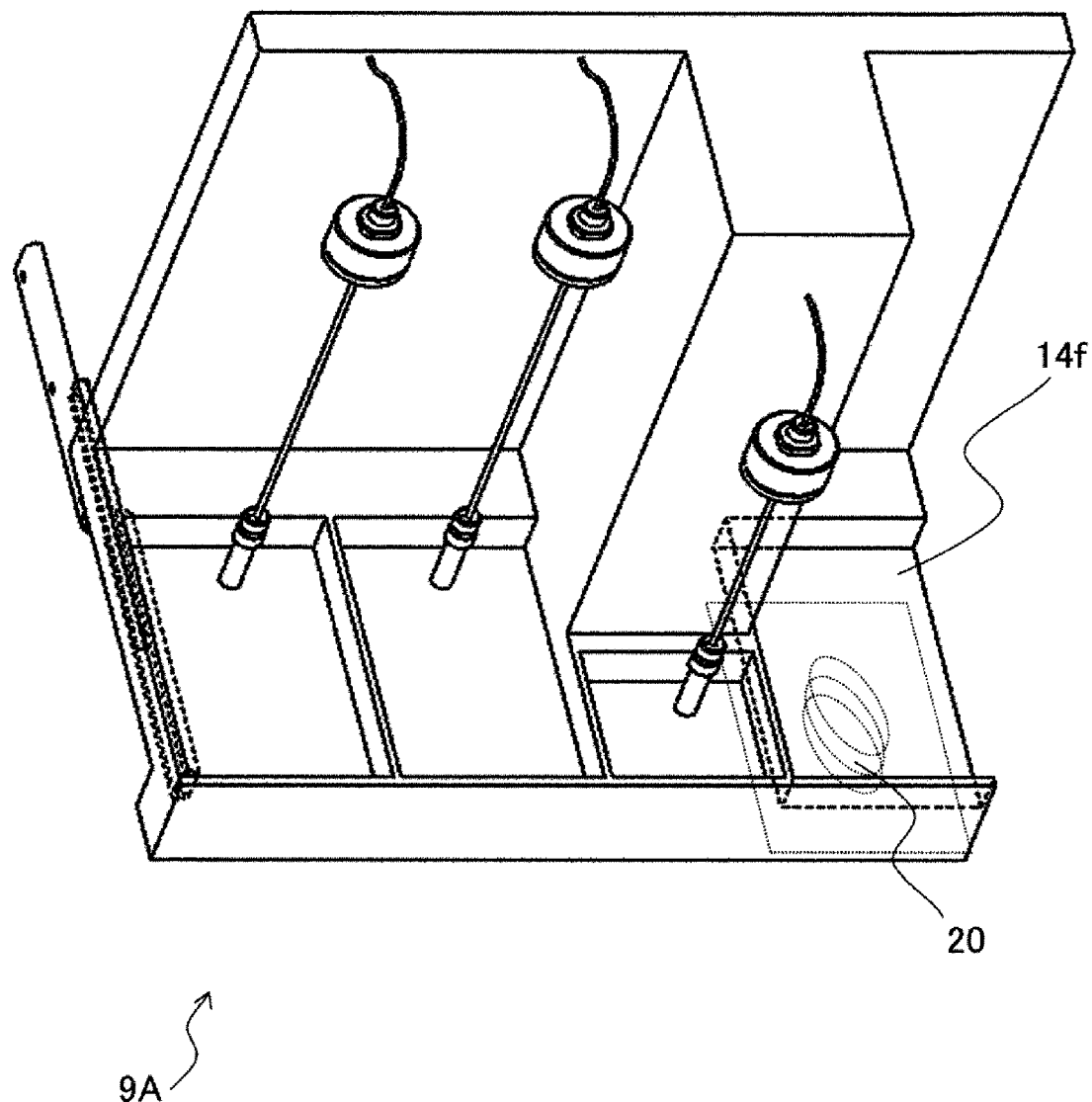

[Fig. 13]
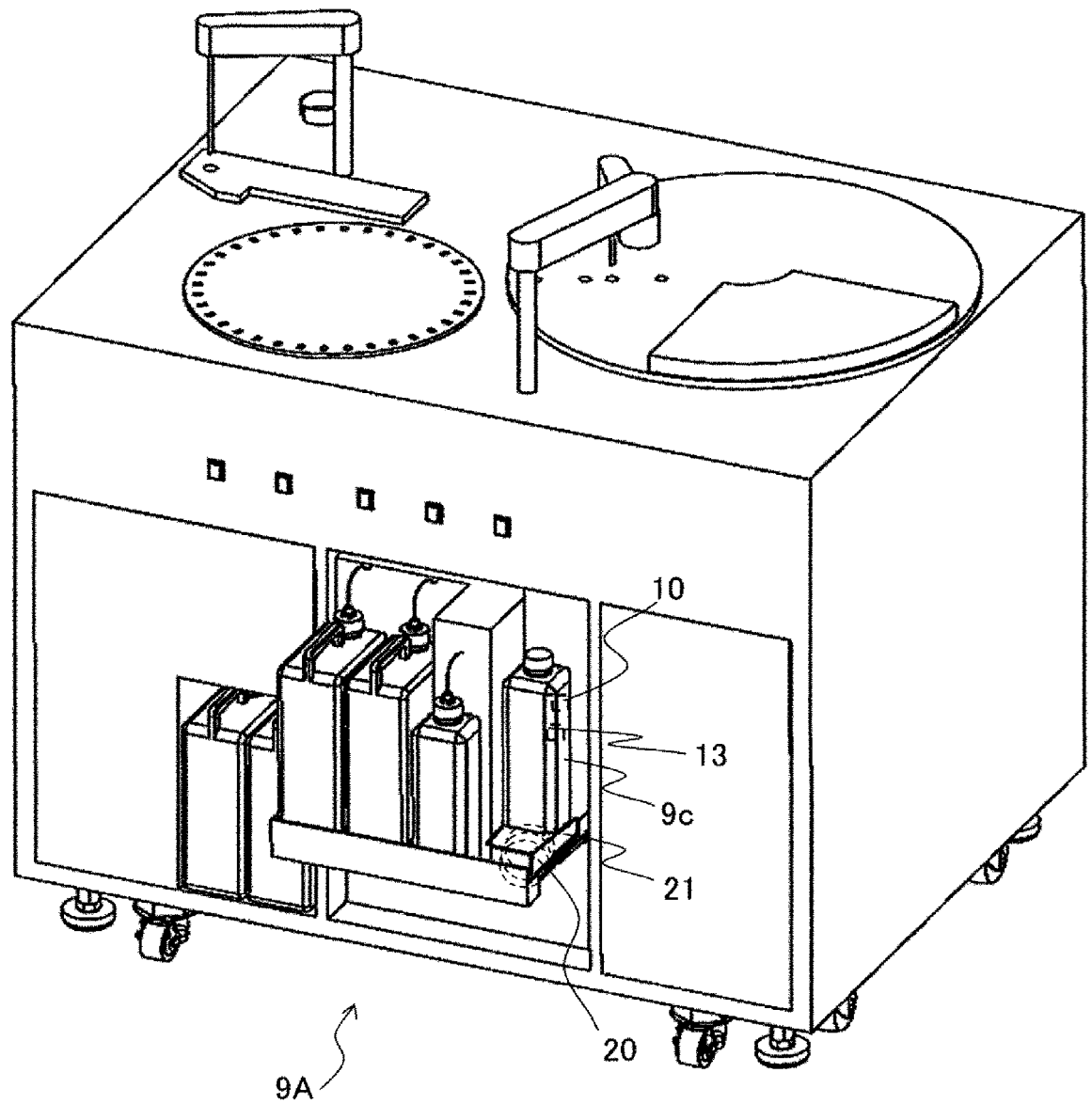

[Fig. 14]
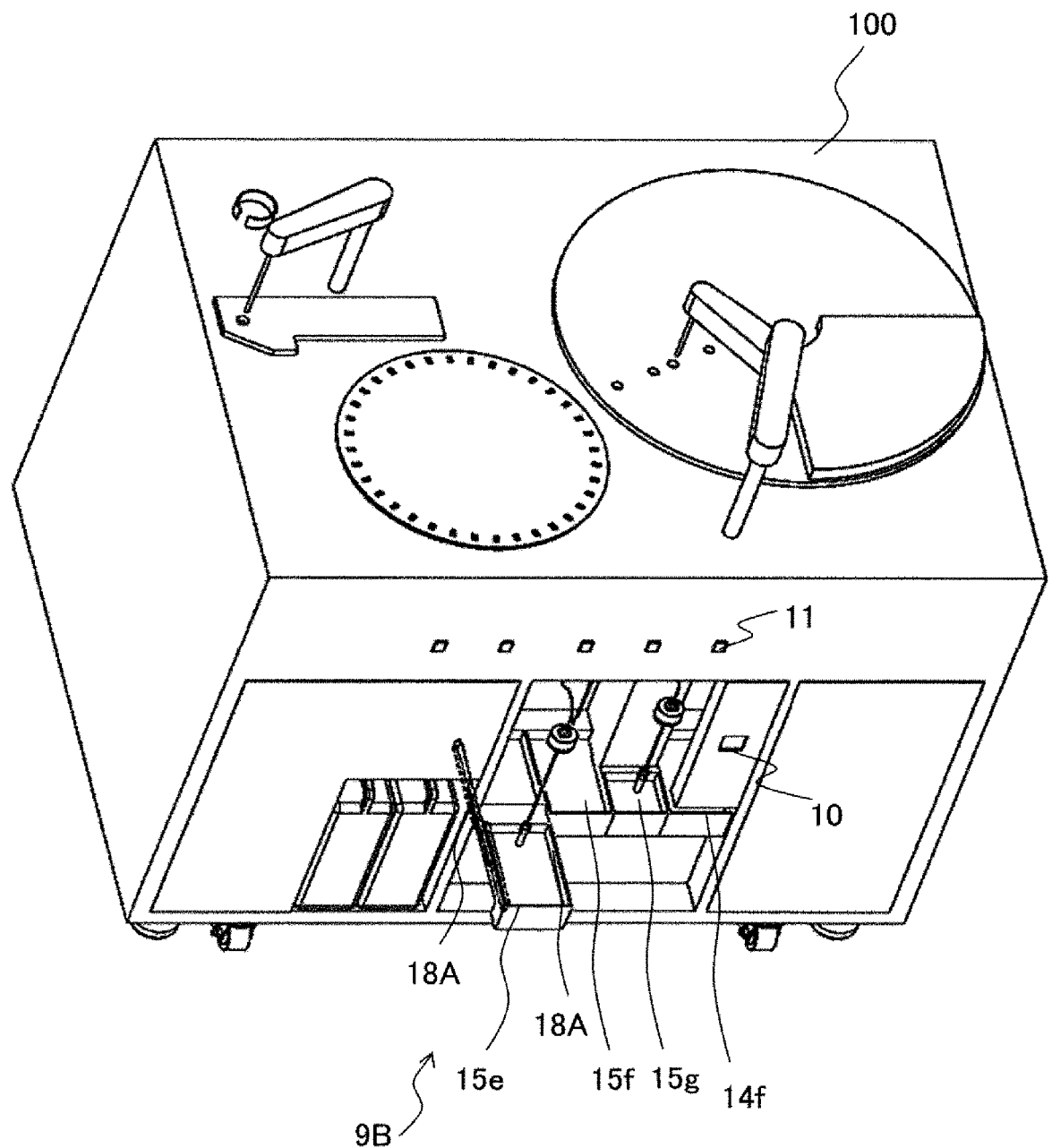

AUTOMATIC ANALYSIS DEVICE AND AUTOMATIC ANALYSIS SYSTEM

TECHNICAL FIELD

The present invention relates to an automatic analysis device and an automatic analysis system that draw a reagent from a reagent container so as to analyze an analyte.

BACKGROUND ART

As an example of a reagent container that can simplify installation work of the reagent container, PTL 1 describes a reagent container that contains a dyeing solution and is set in an analysis device, which is a blood cell counting device or an in-urine physical component analysis device, by being inserted from a side surface of the analysis device toward an inner side of the analysis device. The reagent container includes a suction tube entry part that is provided near a tip in a direction of insertion into the analysis device and allows a suction tube of the analysis device to enter from above, and an inclined surface that is inclined with respect to an outer upper surface of the reagent container on an outer lower surface of the reagent container. The color of the reagent container is black or brown, so as to prevent a reagent from being deteriorated by lights from the outside.

CITATION LIST

Patent Literature

PTL 1: JP-A-2015-111146

SUMMARY OF INVENTION

Technical Problem

As a device that analyzes an analyte such as blood or urine collected from a patient, automatic analysis devices (hereinafter referred to as device) such as a biochemical analysis device and an immunoassay analysis device are known. There are two types of reagents used in these devices: reagents provided in containers having small capacitance and reagents provided in containers having large capacitance.

Reagents used for analyte analysis in the biochemical analysis device are known as examples of reagents having small capacitance. These reagents are provided for each analysis item respectively and are installed on a reagent disc. Approximately 100 mL of a reagent is filled in a reagent container, and is drawn from the reagent container by a reagent probe and dispensed into a reaction container according to the analysis item. Then, the reagent is mixed with a sample such as the analyte from the patient, and then analyzed.

On the other hand, examples of reagents having large volume include alkaline and acidic detergents used in the biochemical analysis device, internal standard solutions, dilute solutions, and comparison electrode solutions used for measuring electrolyte items (hereinafter referred to as ion selective electrode (ISE) items), and the like. These reagents are commonly used in a plurality of analysis items, and the capacitance of these reagents is approximately 500 mL to 2000 mL.

These reagents having large capacitance are not dispensed using the reagent probe. These reagents having large capacitance are generally used by fluidly connecting a reagent bottle to a predetermined place of the analysis device by a tube, a metal cylinder, or the like that is connected to the reagent container.

Therefore, these reagents provided in the containers having large capacitance are not installed on the reagent disc, but are set by a user at a predetermined installation location.

In order to set such a reagent having large capacitance in the device, the user needs to remove a lid of the reagent container and insert the tube connected to the device into the reagent container. In order to prevent contamination of bacteria in the air and evaporation of the reagent, the user also needs to attach a lid attached to the tube to the reagent container.

The above is a current state of reagent exchange operation for the reagents having large capacitance.

In recent years, there has been an increasing demand for improving traceability of test results and reliability of measurement results. For this reason, there is a demand for a function of managing reagent information such as lot number, use start date, and expiration date with the device.

Use of RFID tags is an example of a method for managing the reagent information. The reagent information of each reagent is recognized by the analysis device by reading the RFID tag affixed to the reagent container with an RFID reader provided in the device.

PTL 1 is known as a technique for management of the reagent information by the RFID tags and simplification of the exchange operation of the reagent containers. In PTL 1, by inserting the reagent container into the reagent installation location of the analysis device, it is possible for the user to exchange the reagent without accessing the tube of the device. The reagent information is read from the RFID tag attached to the reagent container with the RFID reader provided at each reagent installation location.

However, in the method in PTL 1, it is necessary to provide each reagent installation location with the RFID reader. That is, there is a problem that it is necessary to secure a space in the device for providing a plurality of RFID readers, which cannot be applied to a small automatic analysis device.

In a general automatic analysis device, there are also problems to be solved from the following two viewpoints.

The first viewpoint is about tube insertion work. As described above, when exchanging the reagent having large capacitance (about 500 mL to 2000 mL), the user needs to remove the lid of the reagent container and insert the tube connected to the device into the reagent container. In some cases, the user also needs to reattach the lid attached to the tube to the reagent container. Therefore, it is necessary to secure a sufficient working space near the tube.

In general, this tube is often installed at a place deeper than a front face of the device by one reagent container, and faces the front surface of the device. Therefore, the user needs to put a hand inside the device to exchange the reagent container.

However, the user needs to exchange the reagent in a small space while being careful not to touch the tube with fingers. In particular, since the small automatic analysis device cannot secure a sufficient working space in the installation location of the reagent container, the reagent exchange operation imposes a heavy burden on the user.

The second viewpoint is about RFID tag reading work. As described above, in the method in PTL 1, the RFID reader is required at each reagent installation location. However, since sufficient space cannot be secured in the small automatic analysis device, it is not possible to equip each reagent installation location with the RFID reader. Alternatively, an aspect of using one RFID reader for a plurality of reagent containers can be considered.

In this case, the user exchanges the reagent container as follows. First, the user supports and fixes the reagent container to be exchanged by a hand before the RFID reader, and makes the RFID reader read the RFID tag of the reagent container. Then, after the reading of the RFID tag is finished, the reagent container is moved to a predetermined reagent installation location and exchanged with an empty reagent container.

In the above exchange operation, the user needs to fix a heavy reagent container up to about 2 kg before the RFID reader without a guide. If a fixed position shifts or the reagent container leaves the RFID reader at a period of time shorter than a reading time, the RFID tag reading fails and the reagent exchange operation must be performed again from beginning. Subsequent movement to the reagent installation location also has the problem that the user is burdened with the heavy reagent container.

An object of the invention is to provide an automatic analysis device and an automatic analysis system that can save a space and reduce a burden of a user due to an exchange operation of a reagent having large capacitance.

Solution to Problem

The invention includes a plurality of means for solving the above problems, and to give an example thereof, there is an automatic analysis device for measuring liquid obtained by mixing a sample and a solution, in which a solution mounting mechanism including a solution mounting part serving as an installation location of a container for holding the solution is provided in a side surface of the automatic analysis device to be drawable, and an RFID reader for reading an RFID tag installed in the container is arranged in a position matching the RFID tag when the containers are placed on the solution mounting part of the drawn solution mounting mechanism, and the solution mounting mechanism includes a temporary installing place for installing one container in addition to the solution mounting part, and the RFID reader is arranged in a position of the temporary installing place.

Advantageous Effect

According to the invention, it is possible to save a space and to reduce a burden of a user due to an exchange work of a reagent having large capacitance. Problems, configurations, and effects other than those described above will be further clarified with the following description of embodiments.

BRIEF DESCRIPTION OF DRAWINGS

FIG. 1 is a view schematically illustrating an entire configuration of an automatic analysis system of embodiment 1 of the invention.

FIG. 2 is a perspective view illustrating a schematic configuration of an analysis unit in the automatic analysis system of embodiment 1.

FIG. 3 is a view schematically illustrating an ISE analysis part and a reagent drawer in the analysis unit of embodiment 1.

FIG. 4 is a view for explaining a state where a reagent container is provided before an RFID reader in the reagent drawer of the analysis unit of embodiment 1.

FIG. 5 is a perspective view illustrating a configuration of the reagent drawer of the analysis unit of embodiment 1.

FIG. 6 is a view illustrating a state where the reagent drawer of the analysis unit of embodiment 1 is held in a reagent installation location.

FIG. 7 is a view illustrating a state where the reagent drawer is drawn to a reagent exchange position in the analysis unit of embodiment 1.

FIG. 8 is a view illustrating an exchange operation procedure of the reagent container of the reagent drawer in the analysis unit of embodiment 1.

FIG. 9 is a view illustrating the exchange operation procedure of the reagent container of the reagent drawer in the analysis unit of embodiment 1 and continues from FIG. 8.

FIG. 10 is a view illustrating an exchange operation procedure of a reagent container of a reagent drawer in an analysis unit of an automatic analysis system of embodiment 2 of the invention.

FIG. 11 is a view illustrating the exchange operation procedure of the reagent container of the reagent drawer in the analysis unit of embodiment 2 and continues from FIG. 10.

FIG. 12 is a perspective view illustrating a configuration of a reagent drawer in an analysis unit of an automatic analysis system of embodiment 3 of the invention.

FIG. 13 is a view where the reagent container is provided before an RFID reader in the reagent drawer in the analysis unit of embodiment 3.

FIG. 14 is a view illustrating a state where a reagent drawer is drawn to a reagent exchange position in an analysis unit of an automatic analysis system of embodiment 4.

DESCRIPTION OF EMBODIMENTS

Hereinafter, embodiments of an automatic analysis device and an automatic analysis system of the invention will be described with reference to the drawings.

Embodiment 1

Embodiment 1 of the automatic analysis device and the automatic analysis system of the invention will be described with reference to FIGS. 1 to 9.

First, the automatic analysis system to which embodiment 1 of the invention is applied and the automatic analysis device provided therefor will be described with reference to FIGS. 1 to 3. As an example of the automatic analysis device, a device including an analysis unit that measures biochemical items and an analysis unit that measures immune items will be described.

FIG. 1 is a view schematically illustrating an entire configuration of the automatic analysis system of the embodiment; FIG. 2 is a perspective view illustrating a schematic configuration of the analysis unit in the automatic analysis system; and FIG. 3 is a view schematically illustrating an ISE analysis part and a reagent drawer in the analysis unit.

An automatic analysis system 1000 in FIG. 1 is a device used for performing qualitative and quantitative analysis of biological samples such as blood and urine, and mainly includes a conveyance unit 200, an analysis unit 100 that measures the biochemical items, an analysis unit 400 that measures the immune items, and a control part 300.

The conveyance unit 200 is used for loading/collecting an analyte rack 206, on which one or more sample containers containing biological samples such as blood and urine to be analyzed are provided, into/from the automatic analysis system 1000, and conveying the analyte rack 206 to the analysis unit 100 or the analysis unit 400.

The conveyance unit 200 includes a rack buffer 204, a rack supply tray 202, a rack storage tray 208, a conveyance line 207, and a conveyance control part 210.

In the conveyance unit 200, the analyte rack 206 installed in the rack supply tray 202 is conveyed to the rack buffer 204 by the conveyance line 207. There is a sample existence determination sensor (not shown) in the middle of the conveyance line 207, and existence of a sample container on the analyte rack 206 is recognized. Here, if it is determined that a sample container exists, a sample barcode (not shown) affixed on the sample container is read by a sample barcode reader (not shown) to recognize sample identification information. In a real system, the identification information identifies a patient.

The rack buffer 204 has a rotor structure that performs circular motion, and has slots that radially hold a plurality of analyte racks 206 on which a plurality of sample containers are placed on outer circumferences of concentric circles. By rotating the slots with a motor, any analyte rack 206 can be carried into or out from a requested destination. Due to such a configuration, it is not always necessary to process the analyte racks 206 in an order of being carried in. In other words, if an analyte rack has a high priority, the analyte rack can be processed first.

The conveyance line 207 is connected to a certain point on the radial circumference of the rack buffer 204, so that the analyte rack 206 is carried in and out. Assuming that the certain point is at a position of 0 degree on the circumference, a sample dispensation line 3A that pulls the analyte rack 206 into the analysis unit 100 is connected to a position at 90 degrees on the circumference from the position where the conveyance line 207 is connected, so that the analyte rack 206 is carried in and out. A sample dispensation line 409 that pulls the analyte rack 206 into the analysis unit 400 is connected to a position of 180 degrees opposite to the sample dispensation line 3A, so that the analyte rack 206 is carried in and out.

The analyte rack 206 that has been dispensed in the analysis unit 100 waits for output of a measurement result in the rack buffer 204, and may be subjected to processing such as automatic retesting if necessary. If processing is completed, the analyte rack is conveyed to the rack storage tray 208 via the conveyance line 207.

The conveyance control part 210 controls an operation of conveying an appropriate analyte rack 206 from the rack buffer 204 to the sample dispensation line 3A and an operation of returning the analyte rack 206 from the sample dispensation line 3A to the rack buffer 204.

The control part 300 includes an user interface such as a display device 310 that displays an operation screen used for ordering measurement items for the sample to be measured and an operation screen to check the measurement results and an input device that inputs various instructions, and the control part 300 plays a role of controlling information of the units of the entire automatic analysis system 1000.

The control part 300 is connected to the analysis unit 100, the conveyance unit 200, and the analysis unit 400 by a wired or wireless network line.

The analysis unit 100 is a unit that performs measurement operations of the measurement items requested for the sample and outputs the measurement results, and is connected to the conveyance unit 200. As shown in FIGS. 1 and 2, the analysis unit 100 includes a reaction disc 1, a reagent disc 2, a sample suction position 3, a reagent probe 4, the sample dispensation line 3A, a sample probe 5, a cleaning mechanism 6, a biochemical measurement part 30 including a light source and a spectrophotometer, a stirring mechanism, an installation location 7 for detergent containers 7a and 7b, an ISE analysis part 8, a reagent drawer 9, an RFID reader 10, reagent button switches 11a, 11b, 11c, 11d, and 11e, cleaning tanks, and a controller 102.

In the analysis unit 100 of the embodiment, ISE reagents, that is, an internal standard solution, a dilute solution, and a comparison electrode solution are installed in the reagent drawer 9.

FIG. 2 is a view specialized in an external shape of the analysis unit 100, in which the cleaning mechanism, the light source, the spectrophotometer, the stirring mechanism, the cleaning tanks, the controller 102, the sample dispensation line 3A, etc. are not shown.

Reaction containers 12 are arranged on a circumference of the reaction disc 1. The sample dispensation line 3A that moves the analyte rack 206 on which the sample containers (not shown) are placed is installed near the reaction disc 1. The sample suction position 3 is arranged on a track of the sample dispensation line 3A.

The sample dispensation line 3A is used for conveying the analyte rack 206 conveyed from the rack buffer 204 to a dispensation position and returning the analyte rack 206 after dispensation to the rack buffer 204.

The sample probe 5 that can rotate and move upward and downward is installed between the reaction disc 1 and the sample suction position 3. A sample syringe (not shown) is connected to the sample probe 5. The sample probe 5 moves while drawing an arc around a rotation axis to dispense the sample from the sample container on the analyte rack 206 to the reaction container 12.

The reagent disc 2 is a storage in which a plurality of reagent bottles containing reagents can be placed on a circumference thereof. The reagent disc 2 is covered with a cover that can keep cold and is provided with suction ports 2a. Reagents having small capacitance and used for different analysis items respectively are installed therein.

The reagent probe 4 that can rotate and move upward and downward is installed between the reaction disc 1 and the reagent disc 2. A reagent syringe (not shown) is connected to the reagent probe 4. The reagent probe 4 moves while drawing an arc around a rotation axis to dispense the reagent from a reagent container to the reaction container 12 by accessing an inside of the reagent disc 2 from the suction port 2a.

The cleaning mechanism 6 is arranged around the reaction disc 1. A cleaning pump (not shown) is connected to the cleaning mechanism 6, and dispenses detergent from the detergent container 7a of the detergent installed at the installation location 7 of the detergent containers 7a and 7b to the reaction container 12. Alkaline and acidic detergents provided in reagent containers having large capacitance are installed at the installation location 7 of the detergent containers 7a and 7b.

The ISE analysis part 8 is arranged on a track of the sample probe 5 around the reaction disc 1.

The ISE analysis part 8 measures an electrolyte concentration in the sample using an ion selection electrode, and is covered with a cover provided with a dispensation port 8a. As shown in FIG. 3, an ISE dilution tank 8b, an ISE electrode 8c, a comparison electrode 8d, and a flow path 8e are arranged on a lower side of the cover. When measuring ISE items, the sample probe 5 accesses the ISE dilution tank 8b from the sample container through the dispensation port 8a to dispense the sample. Two nozzles 8f and 8g are arranged in the ISE dilution tank 8b, and are connected with ISE reagent syringes 8h.

As shown in FIG. 3, the internal standard solution contained in an internal standard solution container 9a and the dilute solution contained in a dilute solution container 9b installed in the reagent drawer 9 are dispensed into the ISE dilution tank 8b via the ISE reagent syringes 8h and the nozzles 8f and 8g. The internal standard solution dispensed into the ISE dilution tank 8b and the sample diluted with the dilute solution are sent to the ISE electrode 8c through the flow path 8e.

On an analysis unit 100 side in the embodiment, the internal standard solution, the dilute solution, and the comparison electrode solution installed in the reagent drawer 9 are reagents provided respectively in containers 9a, 9b, and 9c having large capacitance, are different types of reagents from those reagents held by the reagent discs 2 and 405 arranged on upper surfaces of the analysis unit 100 and the analysis unit 400, and dilute solutions used to dilute the sample.

RFID tags 13 are affixed to the detergent containers 7a and 7b installed at the installation location 7 and the containers 9a, 9b, and 9c containing the ISE reagents installed in the reagent drawer 9, respectively. The RFID tags 13 contain information such as a reagent lot, an expiration date, an opened or unopened state, and the like. The detergent containers 7a, 7b and the ISE reagent containers 9a, 9b, 9c have a same shape as long as they have the same capacitance, and the RFID tags 13 are affixed to a same position of the containers.

In FIG. 2, only the container 9c of the comparison electrode solution has a different capacitance, and thus the RFID tag 13 is affixed to a different position.

Back to FIG. 1, the biochemical measurement part 30 and the stirring mechanism are arranged around the reaction disc 1.

The biochemical measurement part 30 measures an absorbance, an amount of transmitted light, and an amount of scattered light of a reaction solution produced by mixing and reacting in the reaction container 12 on the reaction disc 1 to analyze biochemical components in the sample, and the biochemical measurement part 30 includes the light source, the spectrophotometer, and the like.

The dedicated cleaning tanks are installed in operating ranges of the reagent probe 4, the sample probe 5, and the stirring mechanism.

The sample containers installed on the analyte rack 206 contain the samples such as the patient analyte such as blood and urine, the standard solution for generating a calibration curve, and controls for quality control.

The controller 102 arranged in the analysis unit 100 includes a CPU, a memory, and the like, and is connected to each mechanism in the analysis unit 100 to control operations thereof.

The analysis unit 400 performs measurement operations of measurement items requested for the samples and outputs the measurement results same as the analysis unit 100, and includes an incubator 404, a reagent disc 405, a reagent probe 406, the sample dispensation line 409, a sample probe 403, an immunoassay unit 407, and a controller 408.

The incubator 404 is a disc that performs reactions between the samples and the reagents at a constant temperature.

The immunoassay unit 407 causes the reagent and the sample to mix and react in the reaction container (not shown) disposed on the incubator 404, and analyzes trace components in blood such as hormones in the sample with high sensitivity.

The controller 408 is connected to each mechanism in the analysis unit 400 and controls operations thereof. Since structures and operations of the reagent disc 405, the sample dispensation line 409, the reagent probe 406, and the sample probe 403 are substantially the same as structures and operations of the reagent disc 2, the sample dispensation line A3, the reagent probe 4, and the sample probe 5 of the analysis unit 100 respectively, details thereof are omitted.

Similar to the analysis unit 100, the analysis unit 400 also has a configuration corresponding to the reagent drawer 9, which is not shown in the drawing. On an analysis unit 400 side of the embodiment, a reaction auxiliary solution that assists the reaction between the sample and the reagent in the analysis unit 400 and the dilute solution used for diluting the sample correspond to the solutions provided in the containers having large capacitance.

The above is a general configuration of the automatic analysis system 1000, the analysis unit 100, and the analysis unit 400.

Next, mechanical operations of the automatic analysis system 1000 shown in FIG. 2 will be schematically described.

In the automatic analysis system 1000, an analysis process of colorimetric items and the ISE items of the sample by the analysis unit 100 is generally executed according to the following procedure.

The conveyance unit 200 sends the analyte racks 206 installed in the rack supply tray 202 of the automatic analysis system 1000 onto the conveyance line 207 one by one and carries the analyte racks 206 into the rack buffer 204.

The analyte rack 206 conveyed to the rack buffer 204 is conveyed to the sample dispensation line 3A of the analysis unit 100 or the sample dispensation line 409 of the analysis unit 400 according to the measurement item requested by the control part 300.

When the analyte rack 206 arrives at the sample dispensation line 3A or the sample dispensation line 409, a dispensation operation is performed by the sample probe 5 or the sample probe 403 for each sample mounted on the analyte rack 206.

When the measurement item is the biochemical item, the sample probe 5 discharges the drawn sample into the reaction container 12 on the reaction disc 1, and the reagent probe 4 adds the reagent drawn from the reagent disc 2 to the reaction container 12 and stirs the reagent. Then, the absorbance is measured by the biochemical measurement part 30, and the measurement result is transmitted to the control part 300.

The reaction container 12 used for the analysis is cleaned with water, the alkaline detergent, and the acidic detergent dispensed by the cleaning mechanism 6 and used for a next analysis.

If the measurement item is an electrolyte item, the sample probe 5 dispenses the drawn sample into the ISE dilution tank 8b. The sample is diluted with the dilute solution at a constant ratio. The diluted sample is drawn into the flow path 8e passing through an inside of the ISE electrode 8c.

Then, a potential difference from the comparison electrode 8d in which the comparison electrode solution is drawn from the comparison electrode solution container 9c is measured. Potential difference information is transmitted to the control part 300 via the controller 102.

The ISE dilution tank 8b used for the analysis is cleaned with the internal standard solution and used for a next analysis.

When the measurement item is the immune item, the reagent drawn from the reagent disc 405 by the reagent probe 406 is discharged to the reaction container on the incubator 404, and the sample is further added to the reaction container by the sample probe 403 and then stirred. Then, measurement is performed by the immunoassay unit 407, and the measurement result is transmitted to the control part 300.

The control part 300 obtains a concentration of a specific component in the sample from the transmitted measurement result by an arithmetic process, displays the result on the display device 310 or the like, or stores the result in a storage part, and the like.

Next, configurations of the reagent drawer 9, the RFID reader 10, and the reagent button switches 11 on the analysis unit 100 side will be described with reference to FIGS. 4 to 7.

FIG. 4 is a view for explaining a state where the reagent containers are installed before the RFID reader;

FIG. 5 is a perspective view illustrating a configuration of the reagent drawer; FIG. 6 is a view illustrating a state where the reagent drawer is held in a reagent installation location; and FIG. 7 is a view illustrating a state where the reagent drawer is drawn to a reagent exchange position.

As shown in FIGS. 2 and 4 and the like, the reagent drawer 9 in which the containers 9a, 9b, 9c, 19 holding the solutions are installed can be pulled to a front surface side in side surfaces of the analysis unit 100 to be drawable, is installed adjacent to the RFID reader 10, and has the configuration shown in FIG. 5.

The "front surface" side in the embodiment is an upper or lower side on papers of FIGS. 1 and 2.

As shown in FIG. 5 and the like, the reagent drawer 9 includes a reagent mounting mechanism 14, a reagent mounting part 15, tubes 16, and lids 17.

The reagent mounting mechanism 14 can be moved between a reagent installing position 14a shown in FIG. 6 and a reagent exchange position 14b shown in FIG. 7 by rails 18 for the drawer. That is, the reagent mounting mechanism 14 moves in a front-rear direction when viewed from the front surface of the system 1000.

As shown in FIG. 5, the RFID reader 10 is arranged in a side plate 10a constituting the front surface of the analysis unit 100 near the reagent drawer 9.

An arrangement position of the RFID reader 10 in the side plate 10a coincides with that of the RFID tag 13 attached to a reagent container 19 as shown in FIG. 4 when the new reagent container 19 is placed on a table 14f before the RFID reader 10.

As shown in FIG. 5, a lateral width 14c of the reagent mounting mechanism 14 is a total length of the reagent mounting part 15 on which the containers 9a, 9b, and 9c are mounted, and the table 14f on which the newly installed reagent container 19 is temporarily placed. That is, the lateral width 14c is substantially the same as a total length of the four reagent containers.

In the embodiment, since three reagent containers used for measuring the ISE items are installed in the reagent drawer 9, the lateral width 14c of the reagent mounting mechanism 14 is designed to accommodate four reagent containers, but the lateral width 14c varies depending on the number of reagent containers installed in the reagent drawer 9.

According to these configurations, when the reagent mounting mechanism 14 is pulled out, in addition to a space for the three containers 9a, 9b, and 9c used for measuring the ISE items, before the RFID reader 10 in the side plate 10a, there is still the table 14f providing space that accommodates the reagent container 19 as shown in FIGS. 6 and 7. FIG. 4 shows a state where the reagent container 19 is installed before the RFID reader 10.

The RFID reader 10 can read the information of the RFID tag 13 installed to the reagent container 19 simply by placing the new container on the table 14f during exchange of the containers 9a, 9b, and 9c. Therefore, when the heavy containers 9a, 9b, and 9c having large capacitance are newly arranged in the system 1000, labor required for the user to read the RFID tag 13 can be significantly reduced.

As shown in FIG. 4, a front surface 14d of the reagent mounting mechanism 14 extends downward, and has a handle structure that allows the user to easily pull out the reagent mounting mechanism 14 to the front surface side of the system 1000.

The reagent mounting part 15 is used for installing the containers 9a, 9b, and 9c on the reagent mounting mechanism 14. The reagent mounting part 15 has a structure in which the plurality of containers 9a, 9b, and 9c can be installed in a horizontal row when viewed from the front surface of the system 1000.

A front surface 15a and a side surface 15b (a left side in FIG. 5 when viewed from the front surface of the device) on a side on which the containers 9a, 9b, and 9c are installed of the reagent mounting part 15 extend upward so that the installed containers 9a, 9b, and 9c do not fall.

As shown in FIG. 5, the reagent mounting part 15 is provided with partitions 15c partitioned for each of the containers 9a, 9b, and 9c, so that positions where the containers 9a, 9b, and 9c are installed are clarified. The partitions 15c may or may not exist.

As shown in FIG. 5, of the reagent mounting part 15, an installing space 15d in which the container 9c that accommodates the comparison electrode solution is installed has a smaller container space. This is because the container 9c containing the comparison electrode solution is smaller than the other containers 9a and 9b.

In addition, the installing space 15d of the container 9c is arranged adjacent to the RFID reader 10, that is, the table 14f. A depth 14e of the reagent mounting mechanism 14 is slightly longer than long sides of the containers 9a, 9b, and 9c. Therefore, the RFID reader 10 and the RFID tag 13 of the comparison electrode solution are arranged so as to be displaced from each other in a front-rear direction when viewed from the front surface of the system 1000. Therefore, it is possible to more reliably prevent the RFID tag 13 of the reagent container in use from being erroneously recognized by the RFID reader 10.

A device-side back surface 14g of the reagent mounting mechanism 14 is higher than heights of the containers 9a, 9b, 9c, and 19, and is installed such that the tubes 16 hang down from above. The attached lids 17 are connected to the tubes 16.

If the reagents installed in the reagent drawer 9 are not easily affected by contamination of bacteria in air and evaporation of the reagents, the attached lids 17 are not necessary. The tubes 16 and lids 17 can move between the reagent installing position 14a and the reagent exchange position 14b together with the reagent mounting mechanism 14. When the reagent mounting mechanism 14 is pulled out to the reagent exchange position 14b, upper portions of the tubes 16 and the lids 17 are exposed without being covered by any components of the device.

The lids 17 may have any shape as long as they can be connected to a mouth of the reagent container 19. For example, the lids 17 may have a screw shape, a shape such as a rubber stopper that can be inserted into the mouth of the reagent container, and a shape such as a cap that fits the mouth of the reagent container. FIG. 5 shows the screw shape.

The reagent button switches 11a, 11b, 11c, 11d, and 11e corresponding to the containers 9a, 9b, and 9c in the reagent drawer 9 and the detergent containers 7a and 7b are arranged one by one at an upper portion of the reagent drawer 9 and in the front surface of the analysis unit 100. Examples of the reagent button switches 11 include a button provided with an LED lamp (hereinafter referred to as LED button). Although square LED buttons are shown in FIG. 2 and the like, a shape thereof is not specified.

The reagent button switch 11a corresponds to the detergent container 7a; the reagent button switch 11b corresponds to the detergent container 7b; the reagent button switch 11c corresponds to the internal standard solution container 9a; the reagent button switch 11d corresponds to the dilute solution container 9b; and the reagent button switch 11e corresponds to the comparison electrode solution container 9c.

Although FIG. 2 and the like show an example in which the reagent drawer 9, the RFID reader 10, and the reagent button switches 11 are arranged on the front surface of the device, these components may be arranged on the side surface or a back surface of the analysis unit 100. Positions where these components are installed are determined by the installation locations of the reagents.

The above is the configuration of the reagent drawer 9, the RFID reader 10, and the reagent button switches 11.

Next, an exchange operation of a used reagent container and a new reagent container using the reagent drawer 9 and the RFID reader 10 will be described with reference to FIGS. 8 and 9. FIGS. 8 and 9 are views illustrating a procedure of the exchange operation of the reagent container by the reagent drawer.

The following flow is mainly executed by the controller 102.

First, the controller 102 recognizes that the container 9a, 9b, or 9c is in a used state (step S101), and informs the user via the display device 310 that the container 9a, 9b, or 9c needs to be exchanged (step S102). At the same time, the reagent button switch 11 corresponding to the used container 9a, 9b, or 9c is blinked (step S102), so that the user can visually confirm which one of the containers 9a, 9b, and 9c should be exchanged.

Whether or not the containers 9a, 9b, and 9c have been used can be recognized by various methods such as a method of recognizing by a capacitance sensor and a method of recognizing from the number of times the solution is used * an amount used.

Next, when the controller 102 recognizes that the blinking reagent button switch 11 has been pressed for a first time by the user (step S103), the controller 102 recognizes that the exchange operation of the container starts.

Then, the reagent drawer 9 is pulled out by the user (step S104), and the new reagent container 19 is installed on the table 14f before the RFID reader 10 (step S105).

The controller 102 reads the information of the RFID tag 13 of the new reagent container 19 with the RFID reader 10 to obtain reagent information in the reagent container 19 (step S106A). The controller 102 then determines whether the reagent information is obtained (step S106B) If it is determined that the reagent information is obtained, the process proceeds to step S107. On the other hand, if it is determined that the reagent information is not obtained, the process proceeds to step E106A.

If the reagent information is not obtained, the controller 102 issues an alarm to notify the user (step E106A). The controller 102 ends the reagent exchange operation steps without updating reagent container information (step E106B).

Examples where the reagent information is not obtained include a case where the reagent container 19 is moved by the user before reading the information of the RFID tag 13, a case where the new reagent container 19 is installed in a wrong direction by the user and the RFID tag 13 of the reagent container 19 is not arranged at a position readable by the RFID reader 10, and the like.

Next, the controller 102 determines whether or not the new reagent container 19 can be used (step S107). If it is determined that the reagent container 19 whose reagent information is read can be used, the process proceeds to step S108.

On the other hand, if it is determined that the reagent container 19 cannot be used, the process proceeds to step E107A, and the controller 102 issues an alarm to notify the user (step E107A). The controller 102 ends the reagent exchange operation steps without updating the reagent container information (step E107B).

Examples where it is determined that the reagent container 19 cannot be used include a case where a used (empty) reagent container is erroneously installed by the user, a case where a reagent container that has already been used in another device is erroneously installed by the user, and the like. There is also a case where another type of reagent, which is different from the reagent to be exchanged, is erroneously installed by the user.

When it is determined that the new reagent container 19 installed before the RFID reader 10 by the user can be used, the reagent button switch 11 stops blinking and stays on (step S108). Accordingly, the user can visually confirm that the new reagent container 19 may be exchanged with the used reagent container.

The user removes the lid 17 integrated with the tube 16 from the used reagent container of the reagent mounting part 15 whose reagent button switch 11 is on. The user removes the tube 16 from the mouth of the reagent container and takes out the used reagent container from the reagent mounting part 15 (step S109).

Then, the user lifts the new reagent container 19 from the table 14f before the RFID reader 10 and opens a lid of the reagent container 19. The tube 16 is inserted from the mouth of the reagent container 19, and the lid 17 attached to the tube 16 is connected to the mouth of the reagent container 19 after the reagent container 19 is placed on the reagent mounting part 15 (step S110).

After exchanging the used reagent container and the new reagent container 19, the user presses the reagent button switch 11 for a second time. When the controller 102 recognizes that the reagent button switch 11 is pressed (step S111), the controller 102 recognizes that the reagent button switch 11 is pressed for the second time by the user, and the exchange operation of the reagent container 19 is ended.

Then, the controller 102 turns off the lighting of the reagent button switch 11 (step S112), and displays the ending of the exchange operation of the reagent container to the user in a visually confirmable manner.

The controller 102 determines whether or not to subsequently exchange the reagents (step S112A). If the subsequent reagent exchange is not to be performed, the process proceeds to step S114, and if the subsequent reagent exchange is to be performed, the process proceeds to step S113.

If the press for the second time of the reagent button switch 11 cannot be recognized even after a certain period of time passes since the reagent information was read in step S111, the controller 102 issues an alarm to notify the user (step E111A). The controller 102 ends the reagent exchange operation steps without updating the reagent container information (step E111B).

Examples where the press for the second time of the reagent button switch 11 cannot be recognized include a case where the user does not exchange the reagent container, a case where the user forgets to press the reagent button switch 11 for the second time even though the reagent container is exchanged.

When exchanging a plurality of reagent containers at a same time, it is recognized that the reagent button switch 11 of each of the reagent containers to be exchanged is pressed with the reagent drawer 9 pulled out to the reagent exchange position 14b (step S113). Then, the processes of steps S105 to S112 shown in FIG. 8 are repeated for the number of the containers subjected to the reagent exchange.

Finally, when it is recognized that the user retracts the reagent drawer 9 (step S114), the reagent exchange operation is ended (step S115). When the controller 102 recognizes that the reagent container exchange operation is ended, the controller 102 enables the measurements and other maintenance operations.

Although FIGS. 8 and 9 show a case where the controller 102 performs step S114 after it is recognized that the user retracts the reagent drawer 9, the process of step S114 is not essential.

For example, it is assumed that the user presses the reagent button switch 11 for the second time, confirms that the reagent button switch 11 is on, and then retracts the reagent drawer 9. Therefore, the controller 102 may also end the process recognizing that the reagent exchange operation is ended by a determination of No in step S112A for turning off the lighting of all the reagent button switches 11, so as to enable the measurements and the other maintenance operations.

The above is the exchange operation of the used reagent container and the new reagent container using the reagent drawer 9, the RFID reader 10, and the reagent button switches 11.

In the above method, an example using the reagent button switches 11 is shown, but other than this, any means can be used as long as it is a method of specifying a reagent container to be exchanged and indicating success or failure of reading the RFID tag 13 and start and end of the procedure. For example, a position of the reagent container to be exchanged may be indicated and the success or failure of reading the RFID tag 13 may be reported by voice.

Next, effects of the embodiment will be described.

In the analysis unit 100 and the analysis unit 400 in embodiment 1 of the invention, the reagent mounting mechanism 14 including the reagent mounting part 15 serving as the installation location of the containers 9a, 9b, 9c, and 19 for holding the solutions such as the reagents is provided in the side surfaces of the analysis unit 100 and the analysis unit 400 to be drawable, and the RFID reader 10 for reading the RFID tag 13 installed in the containers 9a, 9b, 9c, and 19 is arranged in a position matching the RFID tag 13 when the container 19 is placed on the reagent mounting part 15 of the drawn reagent mounting mechanism 14.

Accordingly, the device can be miniaturized by minimizing the installing space of the mechanism related to reagent exchange and reducing the number of the components, and at the same time, the burden on the user due to the exchange operation of the reagent having large capacitance is reduced compared with the related art. In particular, the invention can be suitably applied to the analysis units 100 and 400 as shown in FIG. 1, which are small automatic analysis devices in which a sufficient operation space in the installation location of the reagent container is difficult to secure.

The reagent mounting part 15 has a structure (partitions 15c) partitioned for each of the containers 9a, 9b, and 9c, so that the user can stably install the containers 9a, 9b, and 9c, and the burden on the user can be further reduced.

The reagent mounting mechanism 14 has the table 14f used for installing the reagent container 19 in addition to the reagent mounting part 15. Since the RFID reader 10 is arranged at the position of the table 14f, the reagent mounting mechanism 14 can be pulled out without the RFID reader 10 interfering with the containers 9a, 9b, and 9c when the containers 9a, 9b, and 9c are mounted on the reagent mounting mechanism 14. By temporarily placing the container 19 on the table 14f, the RFID tag 13 can be read by the RFID reader 10, and a registration operation of the reagent information for the system 1000 can be performed more easily. Therefore, the burden on the user can be further reduced.

Since the lateral width 14c of the reagent mounting mechanism 14 includes the length of the table 14f in addition to the lateral width of all the containers 9a, 9b, and 9c installed in the reagent mounting part 15, the size of the reagent mounting mechanism 14 can be minimized, and the system 1000 can be more easily miniaturized.

The containers 9a, 9b, and 9c have two or more kinds of capacitance, and in the containers 9a, 9b, and 9c, the place where the container 9c having small capacitance is installed and the table 14f used for installing the reagent container 19 are adjacent to each other, so that the RFID reader 10 and the RFID tag 13 of the container 9c are arranged so as to be displaced from each other in the front-rear direction when viewed from the front surface of the system 1000. Therefore, it is possible to prevent the RFID reader 10 from erroneously recognizing the RFID tag 13 of the reagent container in use.

The reagent mounting part 15 provided in the reagent mounting mechanism 14, the rails 18 for the drawer, the tubes 16 used for obtaining the solutions from the containers 9a, 9b, and 9c, and the lids 17 for the containers 9a, 9b, 9c, and 19 are further provided. The tubes 16 and the lids 17 have a structure in which the upper portion thereof is exposed when the reagent mounting mechanism 14 is pulled out to the solution exchange position. Therefore, during the exchange of the containers, the operation of connecting the tubes 16 to the containers can be performed more easily, and the burden on the user can be further reduced.

On the side surfaces of the analysis unit 100 and the analysis unit 400, the reagent button switch 11 corresponding to each of the containers 9a, 9b, and 9c is provided on the upper side of the reagent mounting part 15 of the reagent mounting mechanism 14. Therefore, the user can easily know which container is to be exchanged during the operation around the reagent drawer 9, and the exchange operation can be performed more smoothly.

Since the reagent button switch 11 is a button provided with the LED lamp, a state of the reagent exchange can be notified to the user by lighting the LED lamp, and usability in the reagent exchange can be improved.

Since the front surface 14d of the reagent mounting part 15 has the handle extending downward, the reagent mounting mechanism 14 can be further easily pulled out to the front surface side of the system 1000.

Since the reagent mounting mechanism 14 is pulled out from the front surface side of the side surfaces, the exchange operation of the reagent container can be performed smoothly.

Although a case where the positions of the containers 9a, 9b, and 9c to be exchanged is notified by the reagent button switch 11 has been described, the positions of the containers 9a, 9b, and 9c to be exchanged can be notified by the display device 310.

Embodiment 2

Embodiment 2 of the automatic analysis device and the automatic analysis system of the invention will be described with reference to FIGS. 10 and 11. FIGS. 10 and 11 are views illustrating a procedure of the exchange operation of the reagent container by the reagent drawer in the embodiment.

The same configurations as in embodiment 1 in the embodiment are denoted by the same reference numerals, and descriptions thereof are omitted. The same applies to the following embodiments.

In contrast with the analysis unit 100 of the automatic analysis system 1000 in embodiment 1, in the automatic analysis system in embodiment 2, the reagent mounting mechanism 14 is provided with an interlock function that prevents a drawing operation and the reading of the RFID reader 10, and movements of the reagent drawer 9 is controlled by the interlock function.

In the automatic analysis system of the embodiment, the reagent drawer 9 is pulled out only when the reagent exchange is started by the user, and is locked when the reagent drawer 9 is pulled out to the reagent exchange position 14b. Then, when the controller 102 recognizes that the reagent exchange operation has been ended by the user, lock is released, and the reagent drawer 9 can be retracted into the device 14a.

The RFID tag 13 is set to a state of being readable by the RFID reader 10 (hereinafter referred to as reading mode) only while the reagent drawer 9 is locked.

The interlock function can be realized by various methods such as a lock member and a limit switch that prevent the reagent mounting mechanism 14 from being pulled out, and details thereof are not particularly limited.

Next, the procedure of the reagent container exchange operation using the reagent drawer 9, the RFID reader 10, the reagent button switches 11, and the interlock function in embodiment 2 will be described with reference to FIGS. 10 and 11.

First, the controller 102 recognizes that the containers 9a, 9b, and 9c are in the used state (step S201), and informs the user via the display device 310 that the container 9a, 9b, or 9c needs to be exchanged as in embodiment 1 (step S202). At the same time, the reagent button switch 11 corresponding to the used container 9a, 9b, or 9c is blinked (step S202), so that the user can visually confirm which one of the containers 9a, 9b, and 9c should be exchanged.

Next, when the controller 102 recognizes that the blinking reagent button switch 11 is pressed for the first time by the user (step S203), the controller 102 recognizes that the exchange operation of the container starts. At the same time, the interlock of the reagent drawer 9 is released (step S204), so that the reagent drawer 9 can be pulled out.

Here, the user cannot press the reagent button switch 11 unless the reagent drawer 9 is retracted, that is, the reagent drawer 9 is interlocked. This control may be in a form in which the reagent button switch 11 is locked so that it cannot be actually pressed, or in a form in which the device does not recognize the start of the reagent exchange operation even if the reagent button switch 11 is pressed.

Then, when it is recognized that the reagent drawer 9 is pulled out by the user (step S205), the reagent drawer 9 is locked at the reagent exchange position 14b, and the controller 102 sets the RFID reader 10 to the reading mode (step S206).

The user installs the new reagent container 19 on the table 14f before the RFID reader 10 (step S207). The controller 102 reads the information of the RFID tag 13 of the new reagent container 19 with the RFID reader 10 to obtain the information of the reagent in the reagent container 19 (step S208A). The controller 102 then determines whether the reagent information is obtained (step S208B). If it is determined that the reagent information is obtained, the process proceeds to step S209. On the other hand, if it is determined that the reagent information is not obtained, the process proceeds to step E208.

If the reagent information is not obtained, the controller 102 issues an alarm to notify the user (step E208). Then, while the process proceeds to step E219, the user repeatedly installs the reagent container 19 on the table 14f before the RFID reader 10 to read the RFID tag until the reagent information is obtained (steps S207, S208A, S208B).

Next, the controller 102 determines whether or not the new reagent container 19 can be used (step S209). If it is determined that the reagent container 19 whose reagent information is read can be used, the process proceeds to step S210.

On the other hand, if it is determined that the reagent container 19 cannot be used, the process proceeds to step E209, and the controller 102 issues an alarm to notify the user (step E209). Then, the process proceeds to step E219 similar as step E208, and the new reagent container 19 is installed on the table 14f before the RFID reader 10 (steps S207 to S209).

When it is determined that the new reagent container 19 installed before the RFID reader 10 by the user can be used, the reagent button switch 11 stops blinking and stays on (step S210). Accordingly, the user can visually confirm that the new reagent container 19 may be exchanged with the used reagent container.

The user removes the lid 17 integrated with the tube 16 from the used reagent container of the reagent mounting part 15 in which the reagent button switch 11 is on. The user removes the tube 16 from the mouth of the reagent container and takes out the used reagent container from the reagent mounting part 15 (step S211).

Then, the user lifts the new reagent container 19 from the table 14f before the RFID reader and opens the lid of the reagent container 19. The tube 16 is inserted from the mouth of the reagent container 19, and the lid 17 attached to the tube 16 is connected to the mouth of the reagent container 19 after the reagent container 19 is placed on the reagent mounting part 15 (step S212).

After exchanging the used reagent container and the new reagent container 19, the user presses the reagent button switch 11 for the second time. When the controller 102 recognizes that the reagent button switch 11 is pressed (step S213), the controller 102 recognizes that the reagent button switch 11 is pressed for the second time by the user, and the exchange operation of the reagent container 19 is ended.

Then, the controller 102 unlocks the reagent drawer 9 and ends the reading mode of the RFID reader 10 (step S214). The controller 102 turns off the lighting of the reagent button switch 11 (step S215), and displays the ending of the exchange operation of the reagent container to the user in a visually confirmable manner.

The controller 102 determines whether or not to subsequently exchange the reagents (step S215A). If the subsequent reagent exchange is not to be performed, the process proceeds to step S217, and if the subsequent reagent exchange is to be performed, the process proceeds to step S216.

If the press for the second time of the reagent button switch 11 cannot be recognized even after a certain period of time passes since the reagent information was read in step S213, the controller 102 issues an alarm to notify the user (step E213A). When it is recognized that the reagent button switch 11 is pressed by the user, the controller 102 stops the alarm (step E213B). Then, the process proceeds to step S214.

In the case of exchanging the plurality of reagent containers at the same time, when the reagent button switch 11 of the reagent container to be exchanged is pressed while the reagent drawer 9 is pulled out to the reagent exchange position 14b (step S216), the process proceeds to step S206 shown in FIG. 10, the reagent drawer 9 is locked again, and the RFID reader 10 is set to the reading mode again (step S206). Then, steps S206 to S215 are repeated for the number of the reagent exchange operations.

Finally, when it is recognized that the reagent drawer 9 is retracted by the user (step S217), the reagent drawer 9 cannot be pulled out due to the interlock (S218), and the reagent exchange operation is ended (step S219). The controller 102 recognizes that the reagent container exchange operation is ended, and enables the measurements and the other maintenance operations.

If the system 1000 issues an alarm in steps E208 and E209, the user can also end the step of the reagent registration operation.

For example, when it is recognized that the reagent button switch 11 is pressed for a long time (for example, for 2 seconds or longer) (step E219), the controller 102 recognizes that the user instructs to suspend the reagent registration operation. Therefore, the reagent drawer 9 is unlocked and the reading mode if the RFID reader 10 is canceled (step E220) Then, the process proceeds to step S217 of FIG. 11, and when the reagent drawer 9 is retracted (step S217), the reagent drawer 9 cannot be pulled out again by the interlock (step S218). Therefore, the controller 102 ends the reagent exchange operation steps without updating the reagent container information (step S219)

The method of stopping the reagent registration operation may be in another form as long as it can be distinguished from the normal press of the reagent button switch 11. For example, the number of seconds for determining a long press (step E219) may be different, or the reagent button switch 11 may be pressed twice.

The above is the procedure of the reagent container exchange operation using the reagent drawer 9, the RFID reader 10, the reagent button switch 11, and the interlock control in embodiment 2.

Other configurations and operations are substantially the same as embodiment 1, and details thereof are omitted.

The automatic analysis device and the automatic analysis system of embodiment 2 of the invention also have almost the same effects as the automatic analysis system 1000 of embodiment 1.

Since the reagent mounting mechanism 14 has the interlock function that prevents the drawing operation and the reading of the RFID reader 10, there is no risk of the reagent drawer 9 being inadvertently pulled out not during the reagent exchange operation. Therefore, it is possible to reduce a risk that the system 1000 will be damaged or the user will be injured by hitting the reagent drawer 9 drawn due to an unexpected situation such as an earthquake.

It is possible to further reduce the possibility that the reagent drawer 9 is accidentally retracted without exchanging the reagent container even if the reagent exchange operation is abruptly interrupted and the user has read the RFID tag 13 of the new reagent container.

There is also an effect of eliminating erroneous recognition of the RFID tag 13 not during the reagent container exchange operation. When the reagent container is mistakenly brought close to the RFID reader 10 by the user, the risk that the RFID reader 10 reads the RFID tag 13 and causes an alarm such as a reading error can be further reduced.

Embodiment 3

The automatic analysis device and the automatic analysis system in embodiment 3 of the invention will be described with reference to FIGS. 12 and 13. FIG. 12 is a perspective view illustrating the configuration of the reagent drawer in the analysis unit of the automatic analysis system of the embodiment, and FIG. 13 is a view showing that the reagent container is installed before the RFID reader.

As shown in FIGS. 12 and 13, in a reagent drawer 9A of embodiment 3, a spring 20 is arranged under the table 14f before the RFID reader in the reagent mounting mechanism 14.

In embodiment 3, the RFID tags 13 attached to the containers 9a, 9b, and 9c having a plurality of types of shapes, particularly different heights, can be easily read by the one RFID reader 10.

For example, in embodiment 1, a positional relation between the RFID reader 10 and the RFID tag 13 is fixed, and the RFID tag 13 cannot be read simply by placing, on the table 14f, a reagent container whose RFID tag 13 is arranged at a position lower than the RFID reader 10. A reagent container having a low height, for example, the container 9c that contains the comparison electrode solution in embodiment 1, must be manually lifted by the user and fixed at the position of the RFID reader 10.

However, in embodiment 3, a position of the table 14f before the RFID reader changes as a shrunk degree of the spring 20 changes depending on a weight of the reagent container 19 placed therein. For example, if the light container 9c is placed therein, the spring 20 does not shrink and the table 14f is fixed at a high position. On the contrary, if a heavy reagent container is placed therein, the spring 20 shrinks and the table 14f is fixed at a low position.

Therefore, even a reagent container having a low height can be read by the RFID reader 10 simply by placing the container on the table 14f. If bottom areas of the reagent containers are the same, the reagent containers having low heights have smaller capacitance. That is, since the reagent container becomes lighter, the spring 20 does not shrink when the reagent container is placed on the table 14f, and is fixed at a high position 21. Since the position of the RFID tag 13 affixed to the container 9c is also raised, the RFID reader 10 can read the RFID tag 13 by simply placing the container 9c on the table 14f.

In embodiment 3, the RFID reader 10 does not read the RFID tag 13 of the used (empty) reagent container or the reagent container that has already been used once in other devices, which is erroneously installed by the user.

Specifically, a non-new reagent container is lighter than a new reagent container since the reagent volume is reduced. Therefore, when the reagent container is placed on the table 14f, the table 14f is fixed at a higher position than when the new reagent container is placed on the table. That is, since the position of the RFID tag 13 affixed to the reagent container is also high, the RFID tag 13 cannot be read by the RFID reader 10 and an error occurs. Accordingly, the user can more easily know that the reagent container is not a new one, and the burden can be further reduced.

Other configurations and operations are substantially the same as the automatic analysis device and the automatic analysis system in embodiment 1, and details thereof are omitted.

The automatic analysis device and the automatic analysis system of embodiment 3 of the invention also have almost the same effects as the automatic analysis device and the automatic analysis system of embodiment 1.

The table 14f is equipped with the spring 20, and the shrunk degree of the spring 20 changes depending on the weight of the containers 9a, 9b, 9c, or 19, so that the RFID tag 13 affixed to the containers 9a, 9b, 9c, or 19 automatically aligns with the RFID reader 10 and becomes readable. Therefore, the burden on the user when introducing the new container 19 into the system 1000 can be further reduced.

The interlock function described in embodiment 2 can also be applied to the embodiment.

Embodiment 4

The automatic analysis device and the automatic analysis system in embodiment 4 of the invention will be described with reference to FIG. 14. FIG. 14 is a view illustrating a state where the reagent drawer is pulled out to the reagent exchange position in the analysis unit of the automatic analysis system of the embodiment.

As shown in FIG. 14, in a reagent drawer 9B of embodiment 4, the reagent mounting parts 15e, 15f, and 15g and the table 14f of the reagent mounting mechanism 14 can be individually pulled out to the front surface of the analysis unit 100 via rails 18A. Therefore, there is an effect that among the containers 9a, 9b, and 9c, only the reagent mounting part corresponding to the container 9a, 9b, or 9c to be exchanged can be pulled out to the front surface, which makes it easier to identify the container to be exchanged.

The table 14f may be pulled out to the front surface side in conjunction with pulling out of any of the reagent mounting parts 15e, 15f, and 15g to the front surface side, or may be pulled out to the front surface side independently, which is not limited.

Other configurations and operations are substantially the same as the automatic analysis device and the automatic analysis system in embodiment 1, and details thereof are omitted.

The automatic analysis device and the automatic analysis system of embodiment 4 of the invention also have almost the same effects as the automatic analysis device and the automatic analysis system of embodiment 1.

The interlock function also can also be mounted as in embodiment 2, or the spring 20 also can be applied to the table 14f as in embodiment 3 in the embodiment.

OTHER EMBODIMENTS

The invention is not limited to the above embodiments, and includes various modifications. The above embodiments have been described in detail for easy understanding of the invention, and are not necessarily limited to those including all the configurations described above.

Further, a part of a configuration of one example can be replaced with a configuration of another embodiment, and the configuration of the another embodiment can be added to the configuration of the one embodiment. Another configuration may be added to a part of the configuration of each embodiment, and the part of the configuration may be deleted or replaced with the another configuration.

REFERENCE SIGNS LIST

1: reaction disc
2: reagent disc
2a: suction port
3: sample suction position
3A, 409: sample dispensation line
4: reagent probe
5: sample probe
6: cleaning mechanism
7: installation location
7a, 7b: detergent container
8: ISE analysis part
8a: dispensation port
8b: ISE dilution tank
8c: ISE electrode
8d: comparison electrode
8e: flow path
8f, 8g: nozzle
8h: ISE reagent syringe
9A, 9B: reagent drawer
9a: internal standard solution container (solution container)
9b: diluted solution container (solution container)
9c: comparison electrode solution container (solution container)
10: RFID reader
10a: side plate
11, 11a, 11b, 11c, 11d, 11e: reagent button switch (solution button switch)
12: reaction container
13: RFID tag
14: reagent mounting mechanism (solution mounting mechanism)
14a: reagent installing position
14b: reagent exchange position
14c: lateral width
14d: front surface
14e: depth
14f: table before RFID reader (temporary installing place)
14g: device-side back surface
15, 15e, 15f, 15g: reagent mounting part (solution mounting part)
15a: front surface
15b: side surface
15c: partition
15d: installing space
16: tube
17: lid
18, 18A: rail
19: reagent container
20: spring
21: position of table when placing comparison electrode solution before RFID reader
30: biochemical measurement part
100, 400: analysis unit (automatic analysis device)

102: controller
200: conveyance unit (conveyance device)
300: control part
310: display device
407: immunoassay unit
408: controller
1000: automatic analysis system

The invention claimed is:

1. An automatic analysis device having a housing with side surfaces for measuring liquid obtained by mixing a sample and a solution, wherein
 a solution mounting mechanism including a temporary installing place, and a solution mounting part serving as an installation location of a plurality of containers for holding the solution is provided in a side surface of the housing of the automatic analysis device to be drawable, and
 an RFID reader for reading an RFID tag installed in one of the plurality of containers is arranged in a position matching the RFID tag when the one container is placed on the temporary installing place of the drawn solution mounting mechanism,
 wherein the temporary installing place comprises a platform configured to hold a single container and the solution mounting part comprises multiple slots configured to hold multiple containers.

2. The automatic analysis device according to claim 1, wherein
 the solution mounting part has a structure partitioned for each of the plurality of containers.

3. The automatic analysis device according to claim 1, wherein
 the solution mounting mechanism has an interlock function for preventing a drawing operation and a reading of the RFID reader.

4. The automatic analysis device according to claim 1, wherein
 a spring is placed at the temporary installing place, and a shrunk degree of the spring changes according to a weight of the one container such that a position of the RFID tag attached to the one container automatically matches a position of the RFID reader and the RFID tag becomes readable.

5. The automatic analysis device according to claim 1, wherein
 a lateral width of the solution mounting mechanism includes a length of the temporary installing place in addition to lateral widths of all installed containers of the plurality of containers in the solution mounting part.

6. The automatic analysis device according to claim 1, wherein
 the plurality of containers have two or more kinds of capacitance and are arranged such that a place where a container having the smallest capacitance among the plurality of containers is installed is adjacent to a temporary installing place for installing one container.

7. The automatic analysis device according to claim 1, wherein
 a front surface of the solution mounting part includes a handle extending downward.

8. The automatic analysis device according to claim 1, wherein
 the solution mounting mechanism is drawn out to a front surface side of the side surfaces of the housing.

9. The automatic analysis device according to claim 1, wherein
 the solution is a reagent used for an analysis of the sample and is at least any one among a reagent that is a different kind from a reagent held by a reagent disc arranged on an upper surface of the automatic analysis device, a dilute solution used for dilution of the sample, and a reaction auxiliary solution for supporting a reaction between the sample and the reagent.

10. An automatic analysis system comprising:
 the automatic analysis device according to claim 1; and
 a conveyance device for supplying the sample to the automatic analysis device.

* * * * *